(12) United States Patent
Golden et al.

(10) Patent No.: US 12,319,105 B1
(45) Date of Patent: Jun. 3, 2025

(54) METHOD AND APPARATUS TO DYNAMICALLY INCREASE TIRE TRACTION IN A VEHICLE BY APPLYING ONE OR MORE CONTROLLED DOWNWARD DIRECTED IMPULSES BETWEEN A BODY OF THE VEHICLE AND A WHEEL OF A VEHICLE

(71) Applicant: Gravic, Inc., Malvern, PA (US)

(72) Inventors: Ethan E. Golden, West Chester, PA (US); Bruce D. Holenstein, Media, PA (US); Dylan R. Holenstein, Newtown Square, PA (US); Jeffrey P. Jarema, Pottstown, PA (US)

(73) Assignee: GRAVIC, INC., Malvern, PA (US)

( * ) Notice: Subject to any disclaimer, the term of this patent is extended or adjusted under 35 U.S.C. 154(b) by 169 days.

(21) Appl. No.: 18/363,393

(22) Filed: Aug. 1, 2023

(51) Int. Cl.
*B60G 17/016* (2006.01)

(52) U.S. Cl.
CPC ........ *B60G 17/016* (2013.01); *B60G 2202/42* (2013.01); *B60G 2400/208* (2013.01); *B60G 2500/30* (2013.01)

(58) Field of Classification Search
CPC .............. B60G 17/016; B60G 2202/42; B60G 2400/208; B60G 2500/30
See application file for complete search history.

(56) References Cited

U.S. PATENT DOCUMENTS 4,722,548 A * 2/1988 Hamilton ........... B60G 17/0155
267/64.15
4,948,164 A * 8/1990 Hano ................. B60G 17/0163
280/124.106

(Continued)

FOREIGN PATENT DOCUMENTS

DE 3610519 A1 10/1987
DE 4201146 A1 7/1992
(Continued)

OTHER PUBLICATIONS

"The Front Axle Lift System in the New 911 Explained." Downloaded from web page: https://flatsixes.com/cars/porsche-options/the-front-axle-lift-system-in-the-new-911-explained/, Oct. 22, 2015, 1 page.
(Continued)

*Primary Examiner* — Carl C Staubach
(74) *Attorney, Agent, or Firm* — Clark A. Jablon

(57) ABSTRACT

Tire traction is dynamically increased in a vehicle by performing a sequence of steps. The vehicle includes a controllable suspension having a damper, a spring, and an active element, a suspension controller, and a controllable aerodynamic element. The body of the vehicle is positioned at a level which allows for a predetermined amount of upward suspension travel. The suspension controller receives a trigger after the body of the vehicle is positioned at a level which allows for a predetermined amount of upward suspension travel. The suspension controller generates a first control signal upon receipt of the trigger. The first control signal is sent to the active element to generate the positive impulse. The positive impulse causes application of force to the wheel of the vehicle in a downward direction, thereby dynamically increasing tire traction. Oscillation of the body of the vehicle is inhibited using the damper as the body of the vehicle oscillates as a result of the spring, thereby inhibiting oscillation of tire traction. The rise of the body of the vehicle is limited by modulating the variable downforce on the body of the vehicle generated by the controllable aerodynamic element.

29 Claims, 13 Drawing Sheets

(56) References Cited

U.S. PATENT DOCUMENTS

| | | | |
|---|---|---|---|
| 4,965,878 A * | 10/1990 | Yamagiwa | B60G 17/016 180/41 |
| 4,975,849 A * | 12/1990 | Ema | B60G 17/0162 280/5.506 |
| 5,033,573 A | 7/1991 | Hrovat | |
| 5,908,217 A * | 6/1999 | Englar | B62D 35/00 296/180.1 |
| 6,249,728 B1 | 6/2001 | Streiter | |
| 6,264,213 B1 | 7/2001 | Kutcher | |
| 6,669,216 B1 | 12/2003 | Elser et al. | |
| 7,571,044 B2 | 8/2009 | Brown et al. | |
| 8,718,897 B2 | 5/2014 | Wright et al. | |
| 9,702,349 B2 | 7/2017 | Anderson et al. | |
| 9,937,908 B2 * | 4/2018 | Morgan | B62D 37/02 |
| 10,752,075 B1 | 8/2020 | Shukla et al. | |
| 10,988,142 B1 | 4/2021 | Mehrotra et al. | |
| 11,046,143 B1 | 6/2021 | Aikin et al. | |
| 11,312,381 B2 | 4/2022 | Mitsumoto et al. | |
| 11,643,098 B1 * | 5/2023 | Bolzoni | G07C 5/008 701/32.3 |
| 11,912,089 B1 * | 2/2024 | Golden | B60G 17/0195 |
| 2002/0109309 A1 | 8/2002 | Schulke et al. | |
| 2005/0033486 A1 * | 2/2005 | Schmitt | B62D 6/00 701/1 |
| 2005/0206231 A1 | 9/2005 | Lu et al. | |
| 2005/0206232 A1 | 9/2005 | Offerle | |
| 2005/0288842 A1 | 12/2005 | Brewer et al. | |
| 2006/0074530 A1 | 4/2006 | Meyers et al. | |
| 2007/0017727 A1 | 1/2007 | Messih et al. | |
| 2007/0255465 A1 | 11/2007 | Brown et al. | |
| 2008/0059021 A1 | 3/2008 | Lu et al. | |
| 2008/0243334 A1 | 10/2008 | Bujak et al. | |
| 2008/0243335 A1 | 10/2008 | Rao et al. | |
| 2017/0080770 A1 * | 3/2017 | Irwin | B62D 35/00 |
| 2017/0137023 A1 | 5/2017 | Anderson et al. | |
| 2018/0244271 A1 * | 8/2018 | Krueger | B60W 60/00182 |
| 2018/0297608 A1 * | 10/2018 | Willis | B60W 10/22 |
| 2019/0389473 A1 | 12/2019 | Chen et al. | |
| 2020/0072705 A1 * | 3/2020 | Kasaiezadeh Mahabadi | G01L 25/00 |
| 2020/0094645 A1 * | 3/2020 | Edren | B60W 10/22 |
| 2020/0317018 A1 | 10/2020 | Nong | |
| 2021/0023951 A1 | 1/2021 | Gomberg et al. | |
| 2021/0260949 A1 * | 8/2021 | Corsico | B60G 11/16 |
| 2023/0242131 A1 * | 8/2023 | Kasaiezadeh Mahabadi | G06Q 10/06311 701/29.1 |
| 2024/0001932 A1 * | 1/2024 | Birch | B60W 30/18172 |
| 2024/0067254 A1 * | 2/2024 | Weston | B62D 1/046 |
| 2024/0101132 A1 * | 3/2024 | Šoštaric | B60W 50/0098 |
| 2024/0132053 A1 * | 4/2024 | De Pinto | B60W 40/112 |
| 2025/0065902 A1 * | 2/2025 | Giovanardi | B60W 50/0097 |

FOREIGN PATENT DOCUMENTS

| | | |
|---|---|---|
| DE | 10244363 B4 | 3/2007 |
| DE | 102015213956 A1 | 1/2017 |
| EP | 4249297 A1 | 9/2023 |
| WO | 0035688 A1 | 6/2000 |
| WO | 20200142668 A1 | 7/2020 |
| WO | 2022112463 A1 | 6/2022 |

OTHER PUBLICATIONS

"New steering wheels and optional lift system for front axle." Downloaded from web page: https://press.porsche.com/presskits_until_2015/products/2015/911Carrera/html/en_26461_0.html 2015, 2 pages.

* cited by examiner

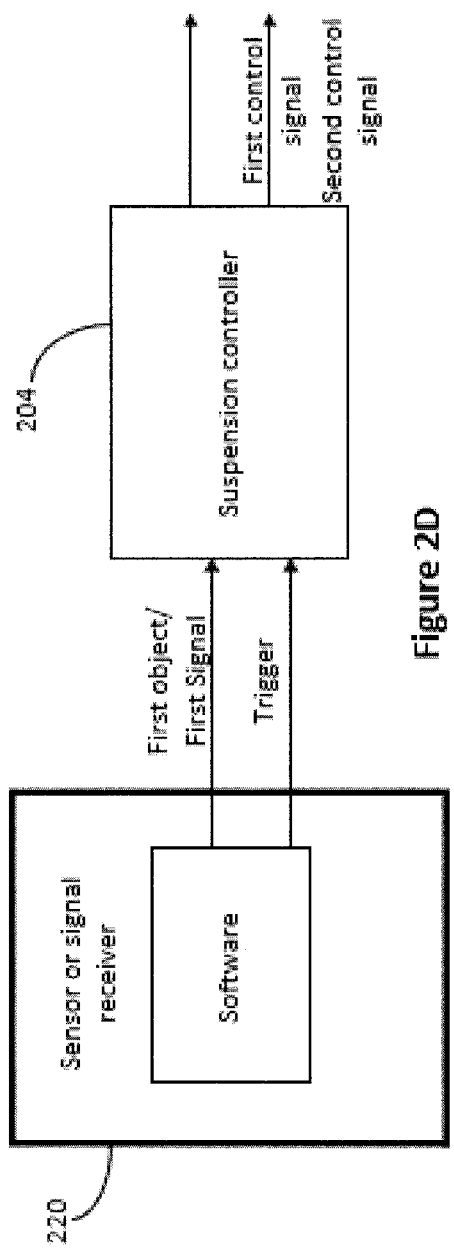
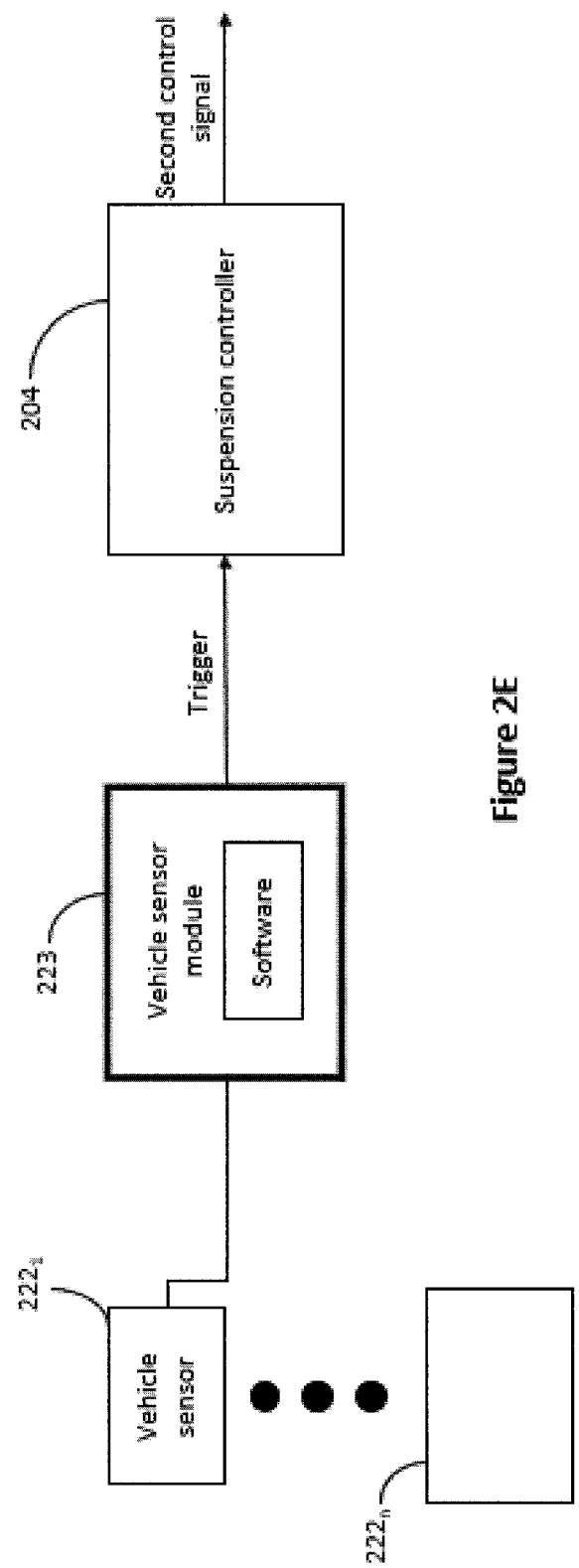

METHOD AND APPARATUS TO DYNAMICALLY INCREASE TIRE TRACTION IN A VEHICLE BY APPLYING ONE OR MORE CONTROLLED DOWNWARD DIRECTED IMPULSES BETWEEN A BODY OF THE VEHICLE AND A WHEEL OF A VEHICLE

CROSS-REFERENCE TO RELATED APPLICATIONS

This application is related to U.S. patent application Ser. No. 18/363,338 filed Aug. 1, 2023 entitled "Method and apparatus to dynamically increase tire traction in a vehicle by generating positive forces between a wheel and a body of the vehicle and then quickly removing such forces."

BACKGROUND OF THE INVENTION

1. Overview Background

There are many instances wherein it is desirable to temporarily increase tire traction in a vehicle so as to improve vehicle handling. One such scenario is when a vehicle is stuck in deep snow, mud, or sand.

WO 00/35688 describes one prior art solution wherein the vehicle is oscillated vertically via a hydraulic suspension-like actuator to get out of sand. U.S. Pat. No. 7,571,044 (Brown et al.) provides an alternative solution wherein during longitudinal oscillations of the vehicle, a suspension member is adjusted to vary a normal force between the vehicle and the surface, wherein the suspension adjustment is based on the longitudinal oscillations. DE 3610519 (Baun) discloses a system that increases a vertical force between the vehicle and the road to improve traction, namely by superimposing vertical oscillations (vibrations) on the rotational motion of each rolling wheel. U.S. Pat. No. 5,033,573 (Hrovat) also discloses a system that increases a vertical force between the vehicle and the road to improve traction, namely by suspension elements that generate a downward normal force on each of the wheels.

U.S. Pat. No. 11,046,143 (Aikin et al.) discloses an actuator command sequence which causes an oscillation displacement motion of a suspension actuator which causes the actuator to execute an individual oscillation displacement motion. The oscillation motion of the actuator is referred to as a "tapping" of the actuator, "pulsing" of the actuator", or "thumping" of the actuator. Thumping of the suspension actuator increases a normal force exerted by the actuator on the "unsprung mass" of the vehicle, which can result in increased contact area of a wheel, and thereby which can result in augmented braking of the vehicle, and which can result in reduced distance and/or time requirements, associated with braking of the vehicle.

U.S. Pat. No. 9,702,349 (Anderson et al.) discloses various embodiments of active suspension systems which use active suspension actuators. In one embodiment, the active suspension can adjust wheel force and tire to road dynamics in order to improve traction during ABS braking events or electronic stability program (ESP) events. For example, the wheel can be pushed towards the ground to temporarily increase contact force (by utilizing the vertical inertia of the vehicle), and this can be pulsated or sustained for a predetermined duration.

Despite the numerous prior art solutions for increasing tire traction in a vehicle under a myriad of conditions, there is still an unmet need for additional solutions that are usable in a large variety of different scenarios, including scenarios where the vehicle is initially stationary or travelling at high speed, and that are not contemplated by the existing prior art solutions. The present application discloses preferred embodiments that meet this need.

2. Additional Background

History of Tires and Traction

Before the invention of the automobile, roads commonly consisted of packed dirt and weathered rocks from frequent travel. Thus, when the first wheels were made, they were required to be strong enough to traverse these materials. Wheels were commonly made of metal or wood. However, these wheels would yield a very rough ride as there was no give over bumps. It wasn't until 1839 when Charles Goodyear invented the process to vulcanize rubber that rubber tires were considered an option. The process of vulcanization changed rubber from a sticky, gummy material that would be overly soft in the heat and hard and brittle in the cold into a more durable material that could bend and deform, and then return to its original shape. In 1860 the first solid rubber tires were introduced. These tires lasted longer than the previous wooden or metal wheels, however, they did not make the ride too much more comfortable. The solid rubber tires still did not have enough give to smoothly roll over bumps.

In the 1880s the bicycle became a popular means of transportation. It allowed people to get around easier and faster than other means of transportation. Early bicycles were referred to as "bone shakers" since the tires were still made of solid rubber. The faster an individual went on a bike the more uncomfortable the ride was. It wasn't until 1888 that John Dunlop invented the first practical pneumatic tire for his son's bicycle. Coincidentally Dunlop's invention came out right around when the first practical automobiles were being developed. Up until this point tires were not detachable. This made repairs difficult, however, in 1891 Edouard Michelin is credited with patenting the first effective detachable pneumatic tire.

While pneumatic tires now allowed for a more comfortable ride, they were still smooth. Tread patterns were in very little demand outside of aesthetic uses. However, as roads improved, speeds increased, and automobiles were being used year-round in all conditions there became a need for an increased level of traction. In 1904 Continental Tire of Germany introduced the first functional tread patterns on tires. Just four years later in 1908 Goodyear Tire Company began to produce grooved tires to further increase the traction of tires on slick surfaces. Innertubes became a requirement to hold air in all new tires as the new tread patterns and grooves increased the chances of air leaking due to wear on the tires.

The next improvement to tires came in 1910 when tire engineers began to use sheets of cotton cord material cut at an angle and layered and molded into sheet rubber. These new tires were called bias ply tires. Bias ply tires were the industry standard in tires until the 1960s. In 1948 Michelin Tire Company produced the first commercially available steel-belted radial tire. These tires had tire cords that were cut at a 90-degree angle (radially) to the wheel. They provided longer tire life, better handling, and an improved fuel economy. Europe and Japan quickly adopted the new form of tire. However, the United States was hesitant to make the change as the equipment was expensive and the radial tires were too harsh for the American suspensions. In 1967 Goodyear made a compromise by producing the first bias belted tire. These tires consisted of a bias ply tire with an added fiberglass belt. The belt allowed for a longer tread life than bias ply tires, but still worked on the softer suspensions of American vehicles. The only downside was that bias belted tires did not have as good fuel economy as steel belted radial tires. The first gas crisis hit in 1973 and Americans began buying radial equipped imports as they had better fuel efficiency. Americans began to demand more fuel-efficient automobiles. By the 1980s radial tires were on all American-built vehicles.

While tires have improved, the roads were still not great. It was not until 1956 that the United States Interstate Highway System began. Flat tires were common, and people would generally travel with more than one spare tire. During the 1970s to the 1980s, Dunlop Tire Company developed the first large scale, commercially successful fail-safe wheel and tire combination to avoid flat tires, commonly referred to as run-flat tires. These tires became standard on certain British vehicle models. Today all new vehicles are required to have a tire pressure monitoring system (TPMS) which alerts the driver when the air pressure in any one of the tires drops a predetermined amount below the tire pressure rated for the vehicle, thereby allowing for safer travel. New non-pneumatic tires (NPT) are being developed as well. These tires are made from modern plastic and consist of a one-piece wheel/tire that is strong enough to support the weight of the vehicle while also remaining resistant to deflection at high speeds. The downside is that NPTs are heavier, and thus they have a higher roll resistance, and they do not dissipate heat as well as pneumatic tires.

Tire Impact on Grip

The type of tire compound in use as well as the width and the temperature of a tire can have a great impact on the amount of grip a race car has on the track. ("Vehicle" and "car" are used interchangeably herein.) The greater the amount of grip the car has, the faster it can navigate the track and the better it will do in a race. Race car tires are typically made from a combination of natural rubber, synthetic rubber, filler, and additives. The amount of each compound used in the tire will dictate the performance of the tire, how much rolling resistance, wear resistance, and traction the tire has.

The main two components in the tire are natural rubber and synthetic rubber. There are two commonly used types of synthetic rubber: butadiene rubber and styrene butadiene rubber. When natural rubber is compared with butadiene rubber and styrene butadiene rubber, natural rubber shows advantages when it comes to tear strength, wear resistance, impact resistance, and low heat generation. However, its disadvantages consist of aging resistance, fatigue resistance, ozone resistance, and dispersion. Styrene butadiene rubber has advantages in aging resistance and having less surface friction; and disadvantages in impact resistance and heat generation. Lastly, butadiene rubber yields advantages in impact resistance, wear resistance, and fatigue resistance, while lacking in tear resistance. These main components are combined together in an amount that makes the best use of each advantage while trying to mitigate the disadvantages. The quantity of each substance will change based off of the purpose for the tire in question as well.

After the natural and synthetic rubber, fillers have the most impact on the functions of a tire. Fillers fill the tread compound's microscopic holes and improve their overall performance. The two commonly used types of fillers are carbon black and silica. Both fillers improve tear resistance, tensile strength, and abrasion resistance. By improving these areas of tire performance, wear resistance and traction will improve as well. Carbon black differs from silica in that it cannot improve the target conflict between rolling resistance, wet performance, and wear, while silica can improve wet performance or rolling resistance with minimal effect on wear. This difference between silica and carbon black is why most high-performance tires are made with silica-based compounds. The downsides to silica are that it has a complex manufacturing process and does not transmit electricity well, both of which can make production of silica-based tires more expensive than carbon black-based tires.

The last component of tire compounds is the additives. Tire additives consist of antioxidants, antiozonants, and softeners. Antioxidants are added to the mixture in order to protect tires from environmental factors such as varying temperatures and oxygen. By adding antioxidants, tire wear decreases giving tires a longer life. Antiozonants prevent tires from ozone damage and the degradation of elastomers inside the tire. Antiozonants have made ozone cracking an uncommon tire failure. Softeners are added to the tire compound to improve filler dispersion and provide ease of mixing when combining each component. Common softeners are oils, fatty acids, or a mixture of the two. The more evenly the filler is dispersed, the greater the effect of the filler, thus the softeners increase every advantage that the fillers present.

Components of Vehicle Suspensions

The suspension in most vehicles is built from several main components. These components include the springs, wheels and tires, dampeners, rods and linkages, joints, bearings and bushings, and a frame. Each component is essential to the suspension functioning properly and serves a different purpose.

The springs of a suspension work to absorb the impact a car will receive when driving over bumps or holes in the road. There are four common types of springs. The first are coil springs. They are made of coiled metals ranging from copper, steel, and titanium to superalloys such as hastelloy, nimonic, and inconel. When the car hits a bump, the springs will compress with the force limiting the car's movement. The second type are torsion bars. Torsion bars function by using the twisting properties of steel bars to act like coils. One side of the bar will be anchored to the frame and the other will be connected to a wishbone which acts as a lever moving perpendicularly to the torsion bar. The third type of spring is leaf springs. These springs consist of several layers of metal that have been bound together. Leaf springs are most commonly used on trucks and heavy-duty vehicles and compress when they hit a bump. The fourth kind of spring is the air spring. Air springs consist of a chamber of air between the wheel and the body of the vehicle. When a bump is hit, the air will compress and absorb vibrations from the tires.

The wheels and tires are external components of the suspension. They take the majority of the impact when driving and cushion the blow. They are often the only components that are directly in contact with the road and greatly affect the ability to drive smoothly as well as the control the driver has over the vehicle.

The dampeners work alongside the springs to reduce impact from bumps and potholes. There are three kinds of commonly used dampeners: shock absorbers, struts, and sway bars. All three support the springs and reduce spring motion. The shocks keep the vehicle from oscillating up and down after the springs compress due to impact. They often contain a thick oil to help the vehicle settle smoothly after hitting a bump, greatly reducing the amount of jolt the driver will feel. Struts are similar to a shock mounted inside of a coil. They do everything the shocks do but also add a level of structural support to the vehicle. The struts can control the speed at which weight is transferred in the car, allowing for a smoother ride. The last kind of dampener is a sway bar. A sway bar can also be referred to as an anti-roll bar. This type of dampener consists of a metal rod that goes across the entire axle joining each side of the suspension together. When one wheel moves up or down due to a bump or pothole, the sway bar transfers some of the movement to the other wheel, reducing the amount the car sways and the risk of rolling the car. Rods and linkages hold each component of the suspension together. They are made out of highly durable materials to help to ensure they last the entirety of the vehicle's life. Failure in the linkages of the suspension is rare, assuming the car has not been through a crash. Such a failure may be catastrophic.

The joints, bearings, and bushings keep the linkages connected to the larger components of the suspension. Bearings and bushings can enable siding and twisting actions to be made in the components that require it. The joints, bearings, and bushings are the most common point of failure in the suspension as bushings that are made from rubber can wear out and joints can become loose over time.

The last component of a suspension is the frame of the vehicle. This is both the largest and possibly most important component of the suspension. The frame carries all of the weight and load of the vehicle including the other components of the suspension. There are four common types of frames. The first and most common type is a unibody design. A unibody design is a frame where the body, floor, and chassis are welded or joined together through some method of connection, thus each part is combined to become one structural element. Unibody vehicles tend to be more fuel efficient due to being lighter weight than other frame types. They also tend to be safer as adding crumple zones and other safety features is easier in unibody frames than in other frame types. Handling and ride comfort tend to be better in unibody frames as well. These benefits come at a trade-off since unibody frames tend to be less capable for off-roading capabilities due to the stress from twisting forces being applied to the entire frame. Repair and manufacturing tend to be more expensive, and damage to the frame tends to affect a larger portion of the car. Also, in order to make different models of the same car, the entire body needs to be redesigned. Unibody frames are typically used in cars, minivans, and crossover SUVs. The second most common frame type is body on frame. This type of frame consists of two components: a frame and a body where each component is built separately and then the body is attached on top of the frame. Body on frame vehicles tend to have better off-roading capabilities as the frame will take the twisting forces from uneven surfaces while the body is unaffected. These types of vehicles can typically handle a larger payload and tow more for the same reason. Due to the two-piece manufacturing process of the body on frame design, manufacturing and repairs tend to be cheaper as either the body or the frame will need to be repaired or adjusted for different models, rather than the entire frame. However, if only one model is required, the manufacturing process will be cheaper for a unibody vehicle as less material is required. The downsides to a body on frame design are the weight and safety of the vehicles. These types of frames tend to be heavier and less fuel efficient. It can also be more difficult to install safety features such as crumple zones. The body on frame design is most commonly used in trucks and some SUVs. The third style of frame is the monocoque design. This type of frame is generally only used in sportscars and race cars. Similar to the unibody frame, it is constructed in one single piece, however, it differs in that all of the structural strength of a monocoque design comes from the body panels or external "skin" of the frame, whereas a unibody frame gains its strength from the tubes, bulkheads, and box sections that make up the frame. A monocoque design can provide an extremely light frame, especially when built with carbon fiber or aluminum, while still maintaining outstanding structural strength, making it perfect for vehicles with the purpose of going fast such as race or sports cars. Monocoque frames tend to provide superior torsional rigidity as well improved handling. The downside to a monocoque frame is the high cost and complexity of repairs. The fourth and final common type of frame is a space frame design. These frames are essentially the opposite of a monocoque frame. Instead of structural strength coming from the panels of the frame, in a space frame design an internal framework of metal tubes carries the weight of the vehicle while the exterior bears an insignificant amount. The benefits of a space frame design are an even lighter weight vehicle than the monocoque frame allowing for faster cars, and easy repairs as broken sections of the frame can be cut out and then new parts can be welded in their place. The downsides are limited access to the engine and other components of the car that are encased in the cage-like frame. Space frame designs are typically used in race cars.

Need for Traction

Traction can be simply defined as the grip between two objects that are touching each other. In the case of automobiles, the main use of traction is between the tires and the road. This instance of traction is what allows a vehicle to move forward when throttle is increased by the driver rather than staying in place while the tires spin. The higher the degree of traction between the vehicle's tires and the road, the better the vehicle will handle. This includes any type of acceleration such as braking, speeding up, and turning since acceleration is a vector, meaning it includes magnitude and direction. Traction is necessary to remain in control of a vehicle. Without it, a moving vehicle would slide out of control and a stopped vehicle could not move without the introduction of external forces. That is why a sheet of ice on the road can be dangerous. Ice has a low coefficient of friction when compared to a normal asphalt road. Traction is equal to the coefficient of friction between the tire material and the road material multiplied by the amount of force pushing the vehicle into the road. Since ice has a low coefficient of friction, there is very little traction when a vehicle is driving on it. Thus, drivers need to be very careful when going over slick surfaces in order to remain in control of their vehicles. Many inventions and innovations with the tires and suspension systems of vehicles are aimed to improve traction while driving since the more traction a vehicle has, the better it will drive and the safer it will be.

Traction Circle

A traction circle, also known as a "circle of forces" or "Kamm circle," is a visual and mathematical way of illustrating how much traction a vehicle or tire has on the road and how it can be used in one prominent way to optimize racing times. As shown in FIG. 5, the circumference of the circle represents the traction limit of the vehicles tires and in an optimal situation, the car will always be using precisely this much traction. Traction is used when accelerating, braking, and turning. The top half of the traction circle represents when the vehicle is accelerating, and the bottom half is when the vehicle is breaking. The right and left sides of the circle represent a right and left turn respectively. With a finite amount of traction in their tires, a driver must budget how much they use on acceleration, braking, or turning.

Traction circles help drivers visualize this concept. For example, on a straightaway the driver will want to accelerate as quickly as possible so they will place all their traction into acceleration. This would be represented by an arrow from the middle of the circle going directly up to the top of the circle as can be seen in FIG. 5, arrow A. When the first right turn is coming up, the driver will want to slow down as quickly as possible thus shifting all their traction into braking, shown by drawing an arrow from the middle of the circle to the bottom of the circle. See FIG. 5, arrow B. As the driver enters the turn, they will begin to ease their way off the brake and begin to turn the wheel to the right. This will free up some of the traction from braking and allow the driver to use the remaining traction to turn. The traction circle would represent this action with an arrow (not shown) to the circumference of circle between the bottom point and the rightmost point, but would not exceed the perimeter of the traction circle. Now the vehicle is fully in the turn, and the driver will completely release the brake to allow all the traction to go into cornering. This method will allow for the fastest turn possible and would be shown by an arrow from the middle to the right side of the circle, displayed by FIG. 5, arrow C. Now the driver is coming out of the turn with another straightaway coming up. The driver will begin to straighten out the wheel to allow for some acceleration. The traction circle would show an arrow (not shown) to the circumference of the circle that is between the top and right side, but would not exceed the perimeter of the traction circle. Finally, the driver comes out of the turn and will completely straighten the wheel and apply all the available traction to acceleration as represented by a straight arrow from the middle of the circle directly to the top, displayed by FIG. 5, arrow A. If a vehicle were to attempt to use more traction than is available by accelerating hard and turning or braking hard and turning, the arrow would be outside the traction circle and the result would be oversteering or understeering as shown in FIG. 5, arrow E. This would cause a loss of traction and likely skidding of the tires.

Tread Pattern

The type of tread pattern used on a race car's tires has a great impact on the amount of traction the car will have. Depending on weather conditions and track style, different tread patterns will be more or less beneficial to receiving the maximum amount of traction. The first notable tread pattern is called a slick. Slicks are a dry weather tire that showcase a smooth tread. They are used on dry, paved tracks and have few or no grooves which allow the tires to have the largest contract patch with the road. The larger the contact patch, the more grip the tire will have on the road. When used in the right conditions, slicks will give a car the greatest acceleration and cornering ability. The downside to running slicks comes when there is moisture or uneven surfaces on the track like when it is raining or the track is made of dirt or gravel. Slicks do not have grooves to lead water or track material to the outside of the tire. This increases the chances of hydroplaning and skidding on loose material. Wet weather tires are the exact opposite of slicks. They display the most aggressive tread pattern available. They have deep grooves to give water between the tires and track a place to go, as well as curved grooves to move the water towards the outside of the tires and away from the contact patch. In wet conditions these tires give the best traction possible. However, they give up a portion of the contact patch and thus would not function as well as slicks in dry conditions. Multipurpose tires, also known as semi-slicks, are a middle ground between slicks and wet weather tires. They have grooves, but not to the extent of the wet weather tires, thereby allowing for more contact with the track while still permitting water to be channeled to the outside of the tire. They are used when weather conditions are not certain, for longer races where the weather could change, and for races where pit stops are not possible. Similar to race cars, passenger cars also use diverse types of tread patterns. Unlike race cars, however, all passenger car tread patterns have grooves as speed is not the main focus, but instead an auxiliary aim when compared to safety and handling diverse surfaces and road conditions. Passenger cars will not change their tires based off road conditions and will typically last much longer than a racing tire. The three types of tread pattern on passenger cars are directional, symmetrical, and asymmetrical. Directional tires feature grooves that are unidirectional. Accordingly, they must be installed in their intended orientation. Directional tires provide better handling when driving on mud or snow. They are mainly used on performance cars as they have increased contact with the road when driving at high speeds, but also support high resistance against hydroplaning and good fuel efficiency. They are a good option for all seasons and provide improved braking and acceleration. The downsides to directional tires are that they wear out quickly and are more expensive than other kinds of tread patterns. Symmetrical tread patterns display mirrored inner and outer sides of the tread. They can be installed in any direction allowing them to be more versatile. Driving with symmetrical tires will allow for a smoother ride, high directional rotation stability, and reduced rolling resistance. They are very affordable and durable tires that support multiple rotation directions and decent handling. The downsides of symmetrical tread pattern tires are they are not ideal for high performance vehicles, they do not provide good traction in wet road conditions, and they are only suitable for daily use. Asymmetrical tread patterns are tread patterns with two distinct tread designs. The outer half of the tread and inner half are designed to handle different conditions. The inner half is meant to displace water to avoid hydroplaning, while the outer half is designed to increase lateral stiffness. These tires have diverse uses as the outer half of the tires allows for a larger contact patch while driving at high speeds, permitting better handling and acceleration, while the inner half allows the vehicle to still handle well in wet conditions at lower speeds. Asymmetrical tread patterns reduce road noise, provide good directional control, improved traction, and safe use in all kinds of weather. The downside to asymmetrical tires is they are a compromise between symmetrical and directional tires, meaning they are not as good at the specific benefits of each respective design, but instead include some features of both.

Coefficients of Static Friction

The actual coefficients of static friction for various race car tires are closely kept trade secrets, however, the average values for various types of tires are commonly stated. For a tire with tread such as a multipurpose tire or wet weather tire the coefficient of static friction will fall between 0.4 in wet conditions and 0.7 in dry conditions. For a slick tire, the coefficient of static friction will fall between 0.1 for wet conditions and 0.9 for dry conditions.

Traction Control

Traction control is a safety feature built into virtually all vehicles currently sold in the United States. Its function is to help maintain a vehicle's traction by limiting how much the wheels of the vehicle can spin. It works by using active sensors to monitor the vehicle's speed and the tire's spin rate. When the tires are spinning faster than the vehicle is moving, the traction control system will automatically kick in and apply the brake to the wheel or wheels that are spinning too fast. This will slow the tire down to the speed that the vehicle is moving, helping the vehicle to regain traction with the road. Traction control is mainly used when driving in less than optimal conditions such as in the rain or snow. If the Vehicle begins to slip on snow or ice, or begins to hydroplane, the traction control system will help the driver stay in control of the vehicle. Traction control is automatically on when the car is turned on, however, can be manually turned off. It is recommended that the driver keep traction control on even in good conditions as it can help if a driver takes a sharp turn too fast and loses traction. The only time when a nonrace car driver may want to turn off the traction control system is when the vehicle is stuck in snow or mud as rapidly spinning the tires can help a vehicle dig down to more solid ground with better traction to escape the frictionless substance.

Anti-Lock Braking System (ABS)

An anti-lock braking system or ABS is another safety feature and is built into virtually all vehicles that are manufactured after 2012. It is integrated directly into the normal hydraulics braking system and consists of valves and pumps as well as sensors that are mounted on each wheel. Its purpose is to control tire grip and monitor how much brake pressure is being used during hard braking. In a vehicle without ABS, the wheels may lock up when braking hard. This can result in an uncontrollable skid and likely an accident as when the tires of a vehicle are sliding instead of rolling, the dominant force of friction is dynamic which generally has a lower coefficient of friction than the static friction from a rolling wheel. Before ABS, the driver would have to pump the brakes to avoid them locking up. However, an anti-lock braking system automatically pumps the brakes up to hundreds of times per second allowing the driver to hold the brake down until they have reached a desired speed or stopped entirely. ABS provides benefits when stopping on slick surfaces such as ice as well.

PRIOR ART

Existing patents in the realm of increasing traction through adjustment to suspension height are minimal or incomplete. WO 00/35688, also discussed above, involves repeatedly bouncing the body of a vehicle in order to increase the amount of traction between the tires and an off roading substance such as mud or sand. This process works for its intended purposes. However, it lacks the functionality required to increase the traction between a vehicle's tires and an asphalt surface while moving at a rapid pace. It will provide no benefit to cornering or acceleration and could have adverse effects on these functions due to the oscillating nature of the design. U.S. Pat. No. 7,571,044, also discussed above, creates a lateral rocking motion along with a coordinated drop of the chassis of the vehicle in order to increase traction enough to remove a stuck vehicle from the substance that it is trapped in. Similar to WO 00/35688, this means of traction increase will not function properly while the vehicle is moving and could prove to be detrimental at high speeds.

What is Needed

Devices and methods are needed that can increase traction in both a stopped position and at high speeds of travel. There should not be oscillation in a vertical or lateral manner as is present in the prior art discussed above, but rather a shifting of the weight of the chassis downwards in a controlled motion. When the chassis of the vehicle returns to its base level, it must do so in a manner that is controlled and gradual, so as not to decrease the amount of down force on the tires and thus the amount of traction. The present invention provides preferred embodiments which meet these needs.

SUMMARY OF THE PRESENT INVENTION

In one preferred embodiment, tire traction is dynamically increased in a vehicle by performing a sequence of steps. First, a center of mass of the body of the vehicle is raised by a predetermined amount above a base level by using an active element of a controllable suspension to generate the positive forces in response to a first signal from a suspension controller. Second, the suspension controller receives a trigger after the center of mass of the body of the vehicle is raised by the predetermined amount above the base level. Third, at least some of the generated positive forces of the active element are removed upon receipt of the trigger in response to a second signal from the suspension controller. The removal of the at least some of the generated positive forces of the active element results in the center of mass of the body of the vehicle dropping back towards the base level and increasing a load on the controllable suspension, thereby dynamically increasing tire traction. The generated positive forces of the active element are removed within a time interval that is sufficient to dynamically increase maximum tire traction by at least ten percent.

In another preferred embodiment, tire traction is dynamically increased in a vehicle by performing a sequence of steps. The vehicle includes a controllable suspension having a damper, a spring, and an active element, a suspension controller, and a controllable aerodynamic element. The body of the vehicle is positioned at a level which allows for a predetermined amount of upward suspension travel. The suspension controller receives a trigger after the body of the vehicle is positioned at a level which allows for a predetermined amount of upward suspension travel. The suspension controller generates a first control signal upon receipt of the trigger. The first control signal is sent to the active element to generate the positive impulse. The positive impulse causes application of force to the wheel of the vehicle in a downward direction, thereby dynamically increasing tire traction. Oscillation of the body of the vehicle is inhibited using the damper as the body of the vehicle oscillates as a result of the spring, thereby inhibiting oscillation of tire traction. The rise of the body of the vehicle is limited by modulating the variable downforce on the body of the vehicle generated by the controllable aerodynamic element.

BRIEF DESCRIPTION OF THE DRAWINGS

Preferred embodiments of the present invention will now be described by way of example with reference to the accompanying drawings:

FIG. 2A-2E are schematic diagrams of the preferred embodiment of FIG. 1.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

Sprung mass is the portion of a vehicle's total mass that is supported by the suspension. It includes the body, frame, internal components, passengers, and cargo. The sprung mass typically does not include the mass of the components at the other end of the suspension components, such as the wheels, wheel bearings, brake rotors, and calipers. These components are part of the vehicle's unsprung mass.

The preferred embodiments described herein refer to "a body of a vehicle." As background, the body of the vehicle is conventionally divided into two main parts, namely, the load-bearing structure and the bodywork. The load-bearing structure is the frame or chassis that provides rigidity and that supports the weight of the vehicle and its load (e.g., passengers, cargo). The bodywork is the outer shell that covers the load-bearing structure. However, in preferred embodiments of the present invention, the "body of a vehicle" includes the entire sprung mass of the vehicle. In the preferred embodiments, the body of the vehicle (sprung mass) are connected to the other end of the suspension components (unsprung mass) by a "controllable suspension," as further discussed below.

I. DETAILED DESCRIPTION OF FIRST PREFERRED EMBODIMENT

A. Overview

In one preferred embodiment of the present invention, tire traction is dynamically increased in a vehicle using a controllable suspension of the vehicle. The controllable suspension has an active element which is configured to generate positive forces between a wheel and a body of the vehicle to raise a (the) center of mass of the body of the vehicle above a base level. The base level is preferably a level associated with normal driving mode of the vehicle where no special efforts are made to increase tire traction via the controllable suspension.

Figure 1:
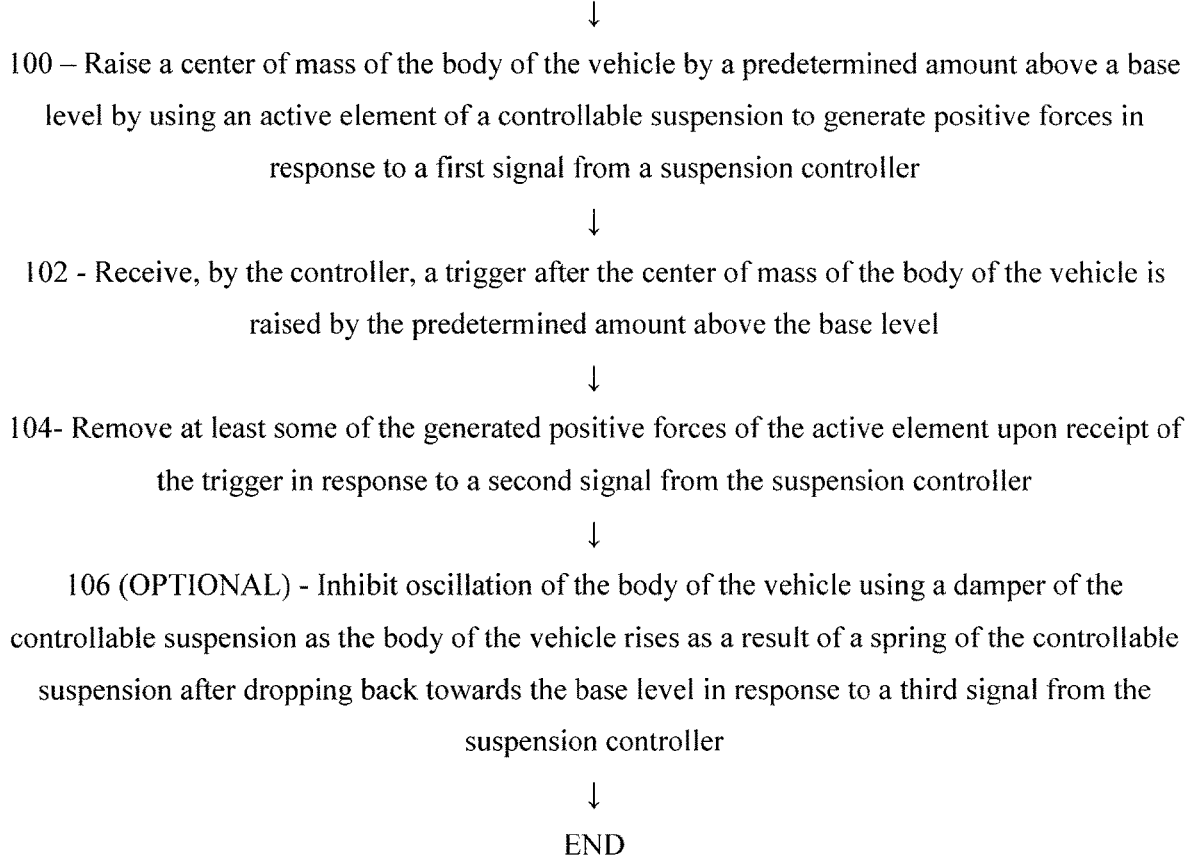
FIG. 1 is a flowchart of one preferred embodiment of the present invention.

FIG. 1 is a flowchart of one preferred embodiment of the present invention and operates as follows:

1. The center of mass of the body of the vehicle is raised by a predetermined amount above the base level by using the active element to generate the positive forces. (Step 100)
2. A trigger is received after the center of mass of the body of the vehicle is raised by the predetermined amount above the base level. (Step 102)
3. At least some of the generated positive forces of the active element are removed upon receipt of the trigger. (Step 104) The removal of the at least some of the generated positive forces of the active element results in the body of the vehicle dropping back towards the base level and increasing a load on the controllable suspension, thereby dynamically increasing tire traction. To ensure that tire traction is increased by a meaningful amount that results in improved vehicle performance, the generated positive forces of the active element are removed within a time interval that is sufficient to dynamically increase maximum tire traction (Max Traction in FIG. 6) by at least ten percent (10%), and in an alternative embodiment, by at least fifty percent (50%), as shown in Table 2.

Figure 2A:
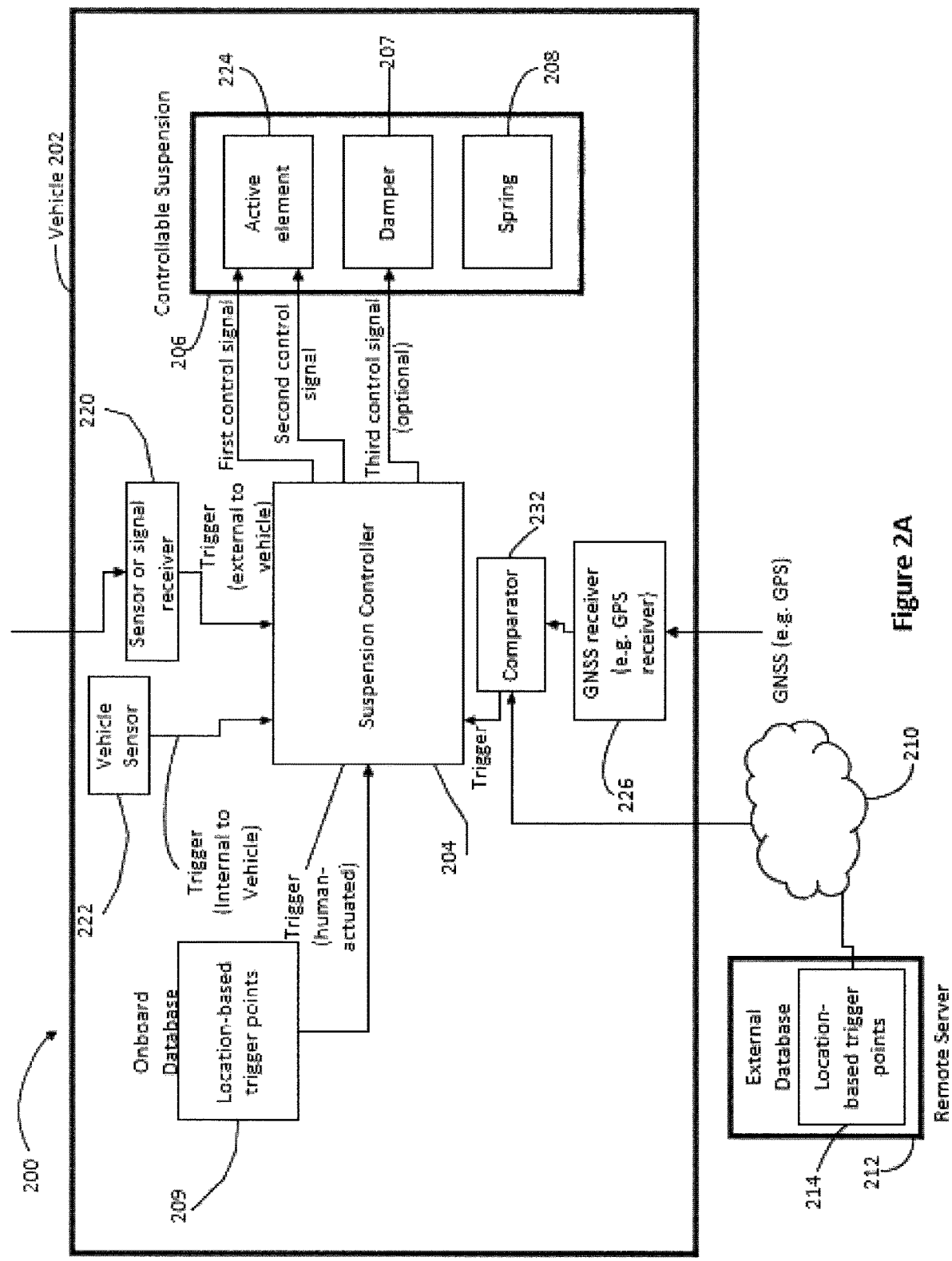

FIG. 2A is a schematic diagram of an apparatus (system) 200 for implementing one preferred embodiment of the present invention. The apparatus (system) 200 operates within vehicle 202 but the vehicle 202 is not actually an element of the apparatus 200. The apparatus 200 includes suspension controller 204 which outputs a first, a second and an optional third control signal that control operation of controllable suspension 206. The suspension controller 204 also receives a trigger. As discussed in more detail below, some triggers are received from sources external to the vehicle 202, whereas other triggers are received from sources internal to the vehicle 202.

Height adjustment systems such as the front axle lift system available in Porsche vehicles raise and lower the front body of the vehicle from a normal ground clearance so as to minimize the risk of scraping the front spoiler lip when approaching raised obstructions or curbs (e.g., speed bumps, the vehicle owner's driveway) in a roadway or roadway-connected pavement. The front axle lift system may be driver-actuated upon command or automatically triggered based on a driver's prestored GPS coordinates associated with a known obstruction or curb. After the obstruction or curb is passed, as calculated by GPS coordinates or by a driver-actuated command, the front body of the vehicle is gradually returned (lowered back) to its normal ground clearance over a time period of at least a few seconds. This slow, gradual change of height for lowering the front body of the vehicle is insufficient to result in any meaningful increase in tire traction. Front axle lift systems are not designed to increase tire traction, but instead are designed to minimize body damage to vehicle body parts from raised obstructions or curbs in a roadway. Accordingly, the fact that the slow time interval for gradually lowering the front body of the vehicle does not provide any meaningful tire traction is not a performance concern for such height adjustment systems.

In one alternative version of the first embodiment, the center of mass of the body of the vehicle is raised by raising the entire body of the vehicle. In another alternative version of the first embodiment, the center of mass of the body of the vehicle is raised by raising a component of the body of the vehicle, such as the engine, or a battery pack in a fully or partially electric vehicle (EV).

B. Controllable Suspension

As discussed above, the controllable suspension 206 has an active element 224 which is configured to generate positive forces between a wheel and a body of the vehicle 202 to raise the center of mass of the body of the vehicle 202 above a base level. The generated positive forces of the active element 224 are also removable, resulting in the body of the vehicle 202 dropping back towards the base level and increasing a load on the controllable suspension 206, thereby dynamically increasing tire traction. While the prior art systems discussed above operate differently than this preferred embodiment, these prior art systems disclose controllable suspensions with active elements that are usable in this preferred embodiment. For example, any of the following controllable suspensions may be used, either wholly or partly, to implement this preferred embodiment.

1. Active suspension system shown in FIGS. 1 and 2 of U.S. Pat. No. 5,033,573
2. Controllable suspension system shown in FIGS. 1 and 2 of U.S. Pat. No. 7,571,044
3. Hydraulic elements shown in the figures of WO 00/35688
4. Suspension elements shown in FIG. 3 of DE 3610519
5. Porsche front axle lift system (lift elements only)

The controllable suspensions of each of these prior art systems are incorporated by reference herein. While the controllable suspensions of these prior art systems are wholly or partly usable in this preferred embodiment, the prior art systems receive different types of trigger and control signals than preferred embodiments of the present invention. Accordingly, the manner of operation of the prior art systems differ from the preferred embodiments even though they may use the same controllable suspension components and, except for the Porsche system, provide increased tire traction.

The suspension actuators shown in FIGS. 2, 3A, 3B of U.S. Pat. No. 11,046,143, which are incorporated by reference herein, include active elements that are usable either wholly or partly, to implement this preferred embodiment. The suspension actuators maintain the vehicle at a "neutral suspension position." However, prior to initiation of the thumping, the '143 patent does not disclose using the suspension actuators to raise the vehicle above the neutral suspension position. In fact, raising the vehicle above the neutral suspension position would counter the effectiveness of the thumping action by limiting the potential for upward travel of the vehicle's sprung mass.

Similarly, U.S. Pat. No. 9,702,349 includes a plurality of embodiments of active suspension actuators, which are incorporated by reference herein, that are usable either wholly or partly, to implement this preferred embodiment. As discussed above, in one embodiment, the active suspension actuator can adjust wheel force and tire to road dynamics in order to improve traction during ABS braking events or electronic stability program (ESP) events by pushing a wheel towards the ground to temporarily increase contact force (by utilizing the vertical inertia of the vehicle), and this can be pulsated or sustained for a predetermined duration. However, prior to pushing the wheel towards the ground, the '349 patent does not disclose using the active suspension actuator to raise the vehicle above a default suspension position.

To implement the controllable suspension 206, the suspension controller 204 is configured to perform at least the following functions:

1. Generate a first control signal to cause the center of mass of the body of the vehicle 202 to be raised by a predetermined amount above the base level by using the active element 224 to generate the positive forces. Raising the center of mass of the body of the vehicle typically reduces air drag on the vehicle because of a reduction of ground effects, down force, and other aerodynamic sources of drag. Additionally, rolling resistance of vehicle tires is reduced because of reduced load on the tires.
2. Receive a trigger after the center of mass of the body of the vehicle 202 is raised by the predetermined amount above the base level.
3. Generate a second control signal to cause at least some of the generated positive forces of the active element 224 to be removed upon receipt of the trigger.

In one alternative (optional) embodiment, the controllable suspension 206 in FIG. 2A further has a damper 207 and a spring 208. In this alternative embodiment, the suspension controller 204 is further configured to generate a third control signal to cause the damper 207 to inhibit oscillation of the body of the vehicle as the body of the vehicle rises as a result of the spring 208 after dropping back towards the base level, thereby inhibiting loss of tire traction. (FIG. 1: Step 106)

The suspension controller 204 may be a single electronic device or a plurality of electronic devices.

Figure 6:
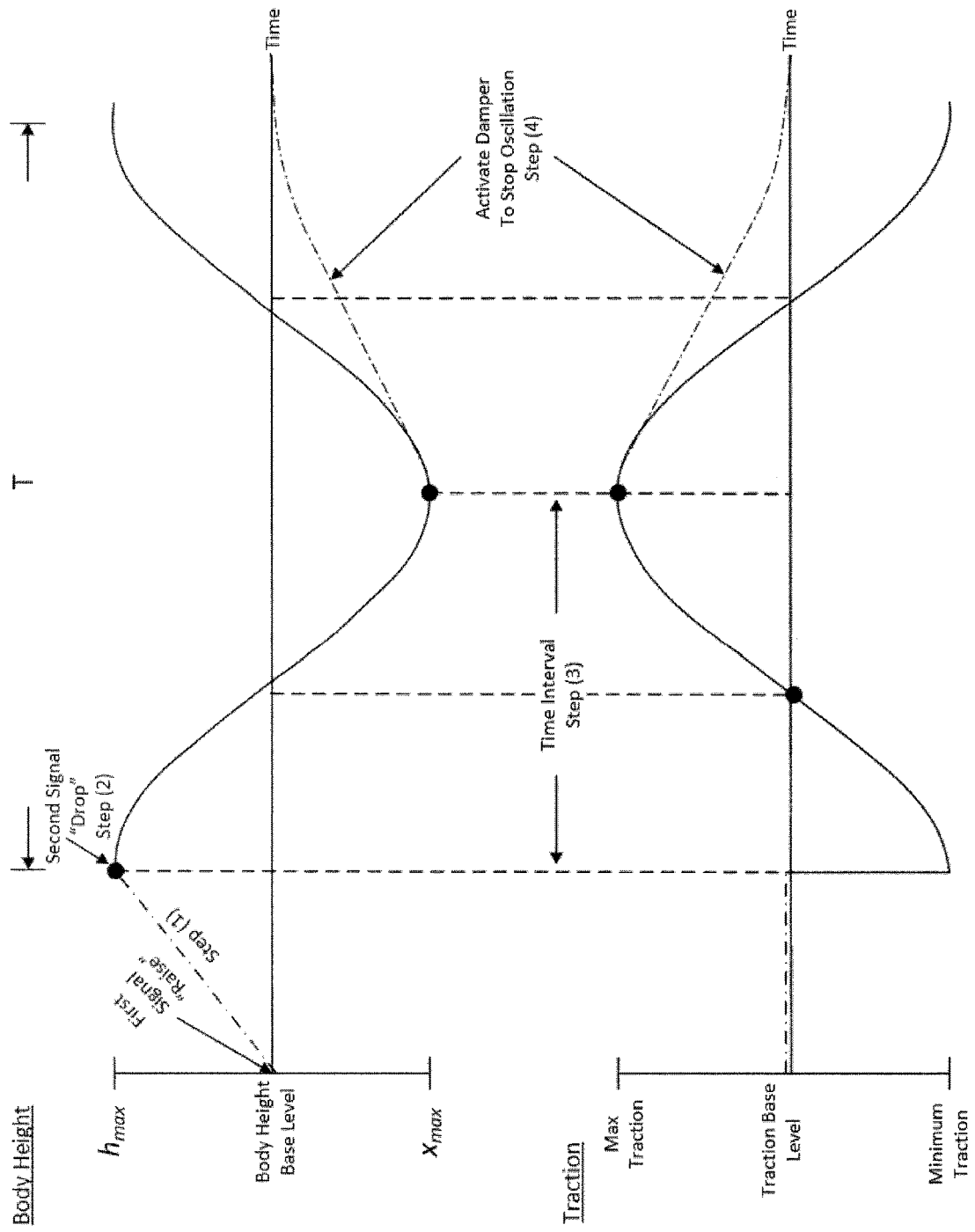
FIG. 6 is a timing diagram in body height and traction in accordance with the preferred embodiment of the present invention shown in FIGS. 1 and 2A-2E.

The raising and lowering of the center of mass of the vehicle 202 with respect to the base level may occur in a plurality of different driving scenarios, including the following scenarios:

1. The vehicle 202 is initially at rest and is being prepared for a large initial acceleration. This scenario exists at the start line of a racing competition. Passenger vehicles such as Teslas have a mode such as "launch mode" that are meant to be driven in this manner from an initial stopped position. In this scenario, the raising of the center of mass of the vehicle's body occurs while the vehicle is at rest and the lowering of the center of mass of the vehicle occurs immediately before or upon acceleration from the initial stopped position. The speed in which the center of mass of the vehicle's body is raised does not affect the ultimate performance and thus the center of mass of the vehicle's body can be raised quickly or slowly as long as it reaches the fully raised level before initial acceleration begins. On the other hand, the center of mass of the vehicle's body must be dropped back towards the base level very quickly before or upon initial acceleration to achieve the goal of increased tire traction. (Tire traction may actually decrease for a brief duration upon the initial descent of the body of the vehicle, as shown in FIG. 6—see the traction plot after the second signal drop.) As explained above, Porsche's front axle lift system, which is not contemplated to be used for this goal, and likely is not mechanically adaptable to very quickly drop back towards a base level, lower the vehicle's body too slowly to provide any significant increased tire traction.
2. The vehicle 202 is in forward motion and about to begin accelerating around a corner or sharp turn. This may occur in a race car environment or during normal driving of a passenger vehicle.
3. The vehicle 202 is in forward motion and about to begin deaccelerating, such as when the vehicle 202 is approaching a stop sign or another vehicle, or upon detection by the driver or collision-avoidance system of an obstruction in the roadway, or when the vehicle is about to turn a corner.

In the scenarios described herein, acceleration is a change in velocity of a vehicle. Velocity is a vector that consists of the direction of travel and speed of the vehicle. Thus, a vehicle may accelerate when the direction of travel of the vehicle changes, even if the speed remains constant. Deacceleration is negative acceleration so the same principles apply, although the most common deacceleration scenario would typically be when the speed of the vehicle decreases.

In one preferred embodiment, the raising of the center of mass of the body of the vehicle 202 and the subsequent lowering of the center of mass of the body of the vehicle 202 occurs by raising the body of the vehicle only over one or more drive wheels of the vehicle 202. In a front-wheel drive vehicle, the body of the vehicle 202 over the front wheels is raised and lowered. In a rear-wheel drive vehicle, the body of the vehicle 202 over the rear wheels is raised and lowered. In an all-wheel drive vehicle, the body of the vehicle 202 over both the front and rear wheels is raised and lowered. Similarly, the generated positive forces and removal thereof occurs over these same appropriate drive wheels of the vehicle 202.

In another preferred embodiment, the raising of the body of the vehicle 202 and the subsequent lowering of the body of the vehicle 202, and the corresponding generated positive forces and removal thereof, occurs over wheels of the vehicle 202 which are expected to experience excess load. Consider, for example, a vehicle which is about to go around a corner or a sharp turn. In this scenario, the outside wheels experience significantly more load than the inside wheels. Accordingly, the body of the vehicle 202 over one or both of the outside wheels is raised and lowered, whereas no such change is made to the body of the vehicle 202 over either of the inside wheels.

In one preferred embodiment, the active element 224 includes an electromagnetic solenoid, or a pneumatic or hydraulic piston.

C. Trigger Details

As discussed above, receipt of the trigger after the center of mass of the body of the vehicle is raised by the predetermined amount above the base level is what initiates removal of at least some of the generated positive forces of the active element, thereby causing the increased tire traction. In one embodiment, all of the generated positive forces are removed. The trigger may come in various forms, including the following forms:

1. The trigger may be a human-actuated signal. For example, the vehicle driver may press a button or speak a command into a voice-actuated input module or make a gesture. This embodiment presumes that the vehicle 202 has already had the center of mass of the body raised and thus is primed to have at least some of the generated positive forces removed upon receipt of the trigger. This state is also interchangeably referred to herein as "preloading" of the vehicle body.
2. The trigger may be automatically actuated based on location of the vehicle 202. Referring again to FIG. 2A, in this embodiment, the vehicle 202 stores location-based trigger points in onboard database 209 shown in FIG. 2A. Alternatively, the vehicle 202 is in real-time communication via electronic network 210 (e.g., the internet) with remote server 212 which tracks the vehicle 202 location in real-time, and the location-based trigger points may be stored in database 214 of the remote server 212. In either of these trigger point storage embodiments, the center of mass of the body of the vehicle 202 is raised by a predetermined amount above the base level when the vehicle 202 is within a first predetermined proximity of one of the location-based trigger points, and the trigger is automatically actuated when the vehicle 202 is within a second predetermined proximity of one of the location-based trigger points. In one alternative embodiment, one location-based trigger point is used and two proximity values are used, the first predetermined proximity being further away from the trigger point than the second predetermined proximity. In another alternative embodiment, two different location-based trigger points are used, and the first and second predetermined proximities may be the same or different values. In yet another alternative embodiment, the vehicle 202 is preloaded, and it is only necessary to detect one location-based trigger point, the receipt of which causes at least some of the generated positive forces to be removed. In all of these embodiments, the location may be based on the coordinates of a satellite-based navigation system (global navigation satellite system (GNSS)), such as GPS. Cellphone tower signals or other terrestrial signals, operating alone or in conjunction with a GNSS system, may also be used to identify the location. To facilitate these location-based embodiments and thereby allow for a comparison of the location-based trigger points to the actual location of the vehicle 202, the vehicle 202 includes a GNSS (e.g., GPS) receiver 226 that receives a signal from a GNSS (e.g., GPS) and comparator 232. The comparator 232 thus periodically or continuously performs a comparison of the actual location of the vehicle 202 and the location-based trigger points to determine if any action needs to be taken with respect to the controllable suspension 206. If so, the comparator 232 outputs a trigger and sends it to the suspension controller 204.
3. The trigger may be generated based on the detection of a fixed roadside object, detection of an object embedded in the road, or detection of a signal generated at a certain location in a road. In these embodiments, the vehicle 202 will need to include a corresponding sensor or signal receiver 220. An example of a suitable sensor for object detection is a camera that captures an image of the object. The signal receiver is suitable for detection of a signal generated at a certain location in the road. Appropriate software is also required in the sensor or signal receiver 220 to process such images or signals. Similar to the embodiments above, there may be two different versions of this embodiment. In one version, the vehicle body is preloaded and thus is primed to have at least some of the generated positive forces removed upon receipt of the trigger. In another version, there are two different objects or two different signals involved in the process, the first object or first signal being used to raise the center of mass of the body of the vehicle 202 via the generated positive forces, and the second object or second signal being used as the trigger to quickly lower the center of mass of the body of the vehicle 202 by quickly removing at least some of the generated positive forces.
4. The trigger may be generated upon detection of a vehicle condition that indicates an immediate or imminent need for additional tire traction (vehicle sensor 222). For example, the trigger may be an automatic signal that is generated upon detection of brake pedal force of the vehicle 202 being greater than a predetermined amount of brake pedal force, such as would occur when the driver of the vehicle slams on the brakes. Alternatively, the vehicle 202 may include an accelerometer, and the trigger may be an automatic signal that is generated upon detection of an accelerometer threshold being exceeded, such as may occur when the vehicle 202 is going into a turn or undergoing hard acceleration. Alternatively, the vehicle 202 may include a wheel slip detector, and the trigger may be an automatic signal that is generated upon detection of wheel slip. This embodiment presumes that the vehicle body has been preloaded and thus is primed to have at least some of the generated positive forces removed upon receipt of the trigger.

Other embodiments of a trigger are within the scope of the present invention. Furthermore, a combination of different types of triggers may be used. For example, a trigger external to the vehicle 202 (e.g., detection of an object) may be used to generate the first control signal, whereas a human-actuated trigger may be used to generate the second control signal.

Regarding preloading of the vehicle body, it is preferable to minimize the time that the vehicle is in a preloaded state because it is more desirable to drive the vehicle with the body of the vehicle at its base level which is generally the level that the vehicle is engineered to be driven at. In addition, a vehicle may be less stable in a preloaded state due to a higher body height. A vehicle may also have more drag in a preloaded state due to, for example, turbulent airflow under the vehicle. Thus, the embodiments which preload the vehicle body shortly before receipt of the trigger are more preferred than embodiments wherein the vehicle is constantly in, or is repeatedly returned to, a preloaded state where it awaits receipt of a trigger signal. However, there may be instances where it is desirable to continually maintain the vehicle in a preloaded state and to return the vehicle to the preloaded state shortly after a trigger results in removing at least some of the generated positive forces. Consider, for example, a race track environment where the benefits of increased tire traction at multiple locations and race conditions may outweigh the disadvantages of continually driving the vehicle in a preloaded state.

FIGS. 2B-2E show additional details of the various trigger embodiments described above.

Figure 2B:
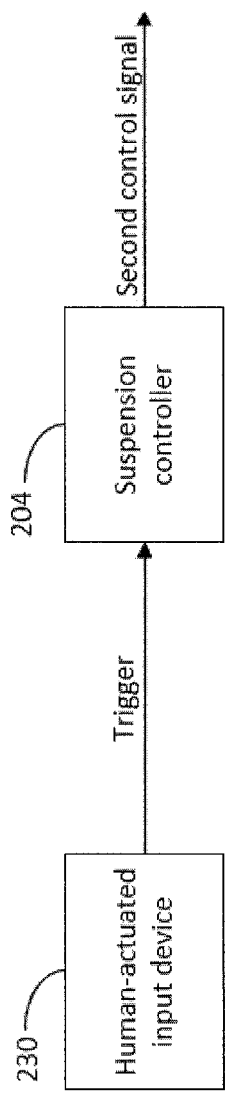

FIG. 2B shows the human-actuated trigger embodiment, which, as described above, may utilize a button, a voice-actuated input module, a gesture recognition device, or may rely on some other form factor that allows for human input, collectively referred to herein as a "human-actuated input device 230." The output of the device 230 is the trigger which is received by the suspension controller 204, which, in turn, sends out the second control signal to the active element 224.

Figure 2C:
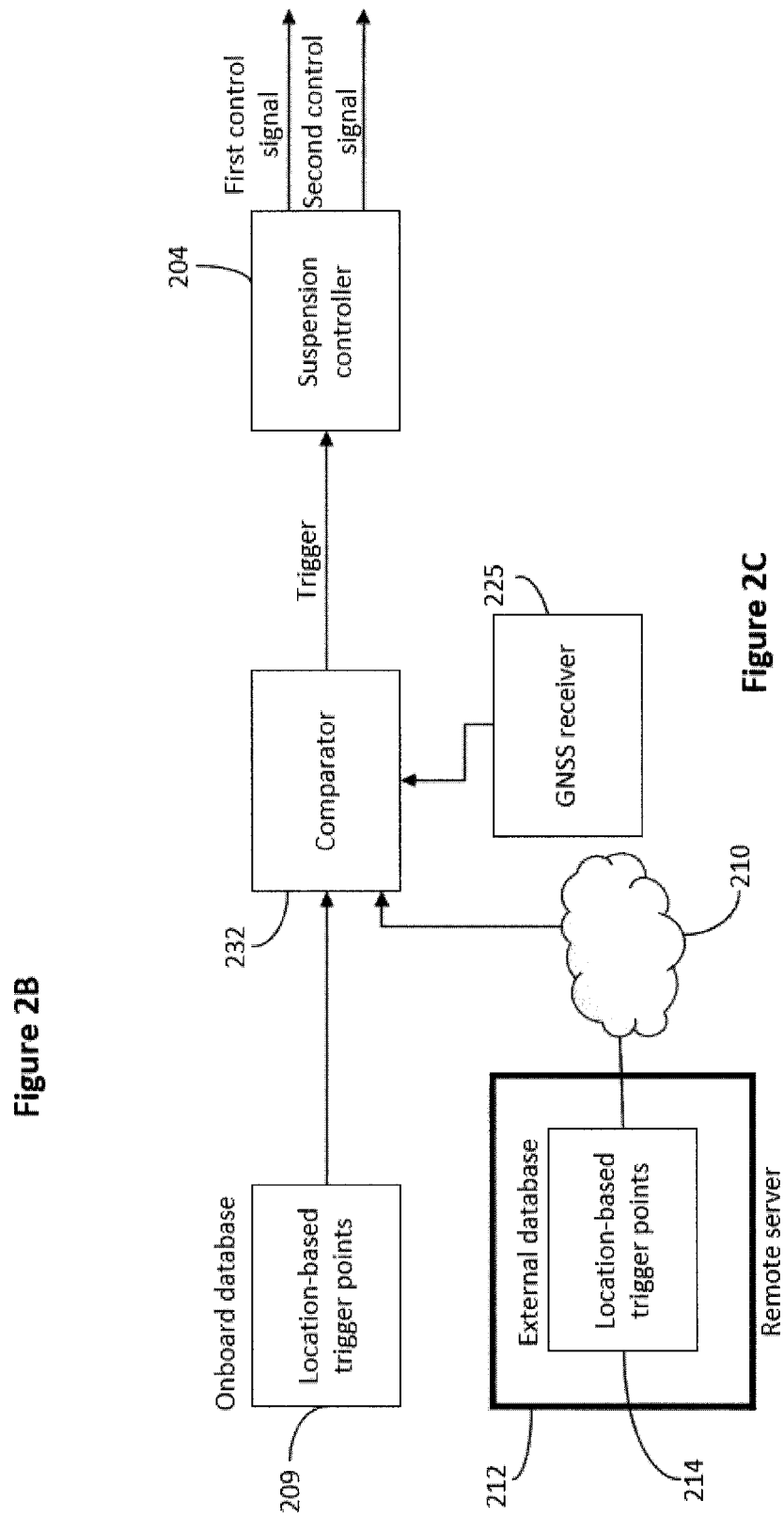

FIG. 2C shows additional details of the embodiments that rely upon location-based trigger points. Such trigger points, from either an onboard database or an external database, are compared to the vehicle's current location as detected by the GNSS receiver 226 using comparator 232. If, or when, the vehicle 202 is detected as being within a predetermined proximity of one of the location-based trigger points, the trigger is outputted by the comparator 232 and sent to the suspension controller 204, which, in turn, sends out the second control signal to the active element 224. As described above, this process may also be used to cause the comparator 232 to send out the first control signal to the active element 224 which would be quickly followed by the second control signal being sent out to the active element 224 as the vehicle 202 continues along its path. In one version of this embodiment which relies upon two different trigger points, one for causing the first control signal to be generated, and another for causing the second control signal to be generated, the predetermined proximity may be zero, in which case the comparator 232 detects whether the vehicle 202 is exactly at the respective location-based trigger points.

FIG. 2D shows additional details of the embodiment that relies upon a sensor or signal receiver 220. Software within the sensor or signal receiver 220 analyze the received signal to determine whether to output a trigger to be received by the suspension controller 204, which, in turn, sends out the second control signal to the active element 224. As described above, this process may also be used to detect the presence of a first object or first signal, which, in turn, causes the comparator 232 to send out the first control signal to the active element 224 and which would be quickly followed by the second control signal being sent out to the active element 224 as the vehicle 202 continues along its path wherein a second sensor or second signal causes the trigger to be sent to the suspension controller 204.

FIG. 2E shows additional details of the embodiment that relies upon detection of a vehicle condition using a vehicle sensor 222 that indicates an immediate need for additional tire traction. Outputs of one or more vehicle sensors $222_1$-$222_n$ are sent to vehicle control module 223 and software within the module 223 determines in real time whether a sensor value of a particular vehicle condition indicates the immediate or imminent need for additional tire traction. If so, a trigger is sent to the suspension controller, which, in turn, sends out the second control signal. In one version of this embodiment, an output signal of only one vehicle sensor 222 is used. However, in another version, output signals of a predetermined combination of vehicle sensors $222_1$-$222_n$ are analyzed by the software of the module 223 in real time to determine whether a particular vehicle condition indicates the immediate or imminent need for additional tire traction.

D. Damper/Spring Vs. Conventional Suspension

As discussed above, in one alternative embodiment, the controllable suspension 206 further has a damper 207 and a spring 208, and the suspension controller 204 is configured to generate a third control signal to cause the damper 207 to inhibit oscillation of the body of the vehicle 202 as the body of the vehicle rises as a result of the spring 208, thereby inhibiting loss of tire traction.

Most modern vehicle suspension systems include a strut and coil spring assembly located near each wheel wherein a portion of the strut extends within the coil spring. The strut provides a dampening effect when the vehicle goes over a bump or experiences vertically applied forces such as from hard braking. Most conventional strut and coil spring assemblies are passive, and thus do not receive any control signals to modify their operation. In one alternative embodiment of the present invention, the damper 207/spring 208 is a conventional strut and coil spring assembly, or shock absorber and coil spring, with no active element.

Active suspension systems exist today which provide control signals to modify their operation. In one alternative version of the first embodiment of the present invention, the damper 207 receives such a control signal (i.e., the third control signal). However, unlike a conventional active suspension wherein the control signal to the damper element is based on specifically preprogrammed real time vehicle performance parameters, in this alternative version of the first embodiment of the present invention, the control signal is based, at least in part, on the timing of the second control signal. For example, the default dampening effect caused by the damper 207 may be stiffened milliseconds after the second control signal is applied and then gradually loosened back to a default value. The dampening effect can therefore modify both the descent of the body of the vehicle and the upward travel of the body of the vehicle back to, or beyond, its base level. In the most advanced application, the dampening effect may be dynamically modified over the entire duration of the application of the damper 207. Such dynamic dampening may be used to reduce or increase the traction enhancement over the default traction resulting from undampened motion of the body of the vehicle.

To the knowledge of the inventors of the present application, control signals in active suspension systems are not associated with a process that inhibits oscillation of the body of the vehicle using the strut (damper) as the body of the vehicle rises as a result of the coil spring (spring) after dropping towards a base level due to the generation and removal of positive forces using an active element of a suspension, as described above.

E. Controllable Suspension and Damper/Spring

The discussion above describes two distinct active suspension-related components of the controllable suspension 206, each performing different functions, namely, (i) the active element 224 that generates and removes the positive forces, and (ii) the combination of the damper 207 and the spring 208 that inhibits oscillation of the body of the vehicle when the positive forces are removed. These suspension-related components may be constructed of two completely independent structural and electronic components such as variations of prior art suspension-related components discussed above.

F. Illustrations of Vehicle and Vehicle Component Positions

Figure 7:
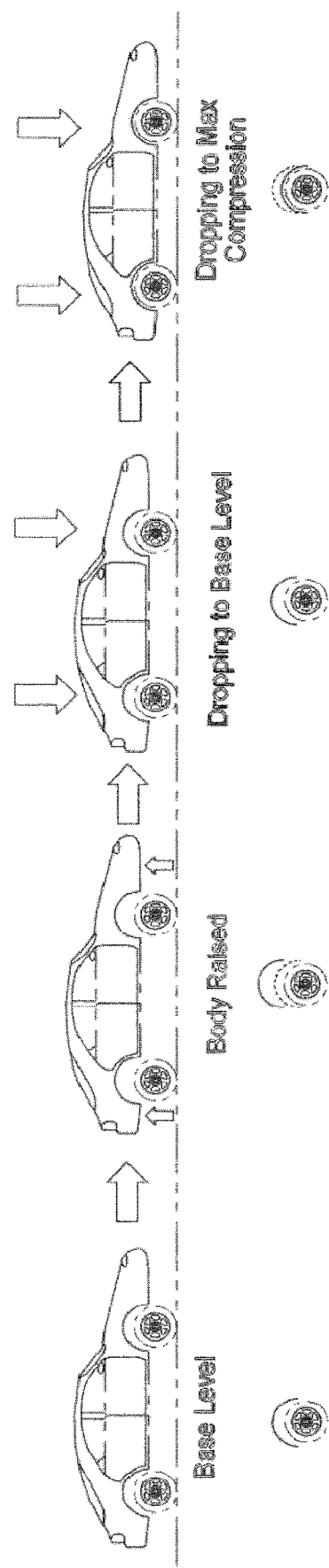
FIG. 7 is a side view illustration of a vehicle in accordance with the preferred embodiment of the present invention shown in FIGS. 1 and 2A-2E.

FIG. 7 illustrates a succession of different positions of the vehicle in accordance with the preferred embodiment of the present invention shown in FIGS. 1 and 2A-2E, including a base level, body raised, body dripping to base level, and body dropping to maximum compression.

Figure 8:
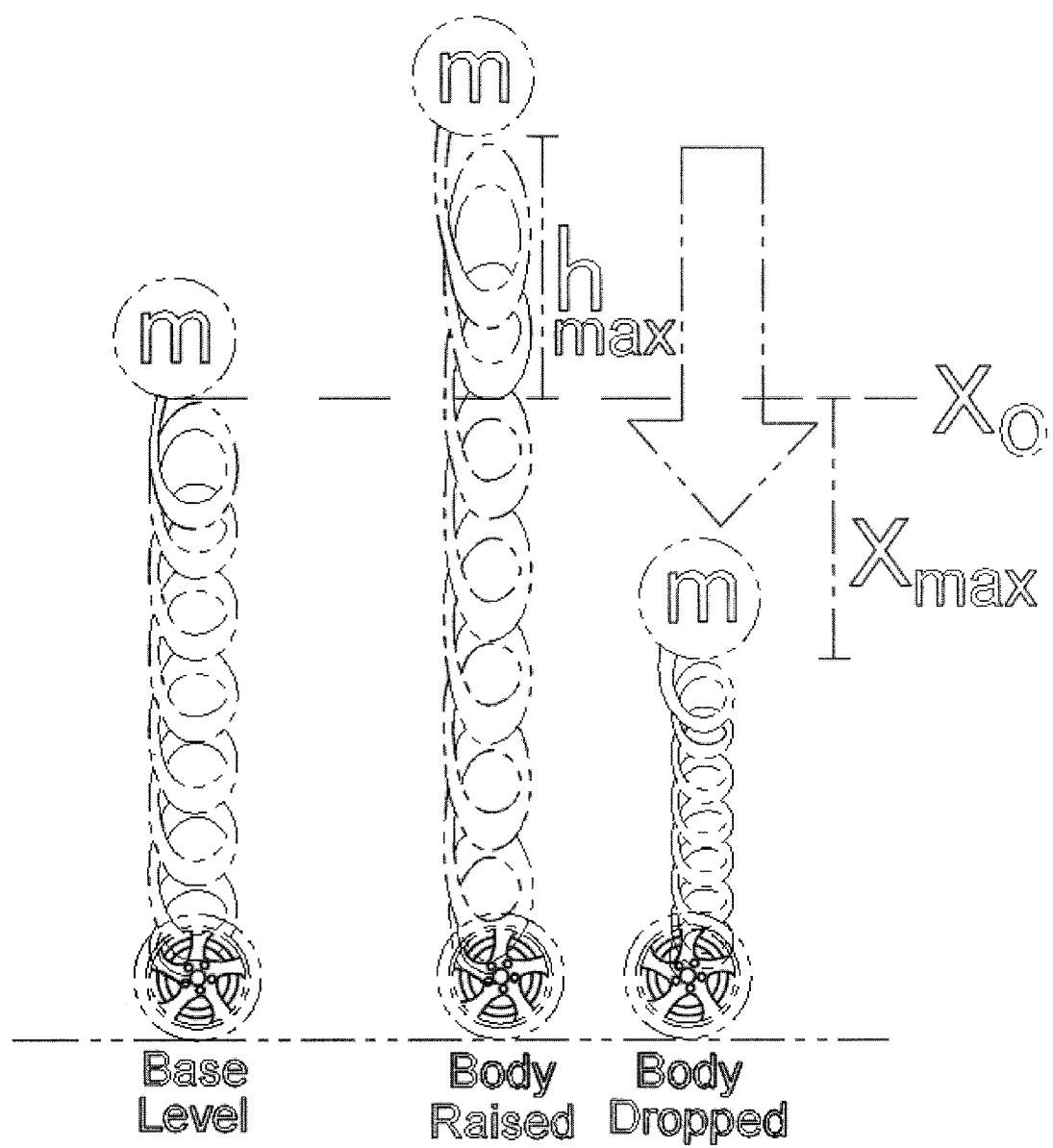
FIG. 8 shows the compression process of suspension springs attached to the body of a vehicle in accordance with the preferred embodiment of the present invention shown in FIGS. 1 and 2A-2E.

FIG. 8 shows the compression process of suspension springs attached to the body of a vehicle in accordance with the preferred embodiment of the present invention shown in FIGS. 1 and 2A-2E, including base level, body raised, and body dropped. FIG. 8 is described in more detail below.

II. DETAILED DESCRIPTION OF SECOND PREFERRED EMBODIMENT

A. Overview

Figure 3:
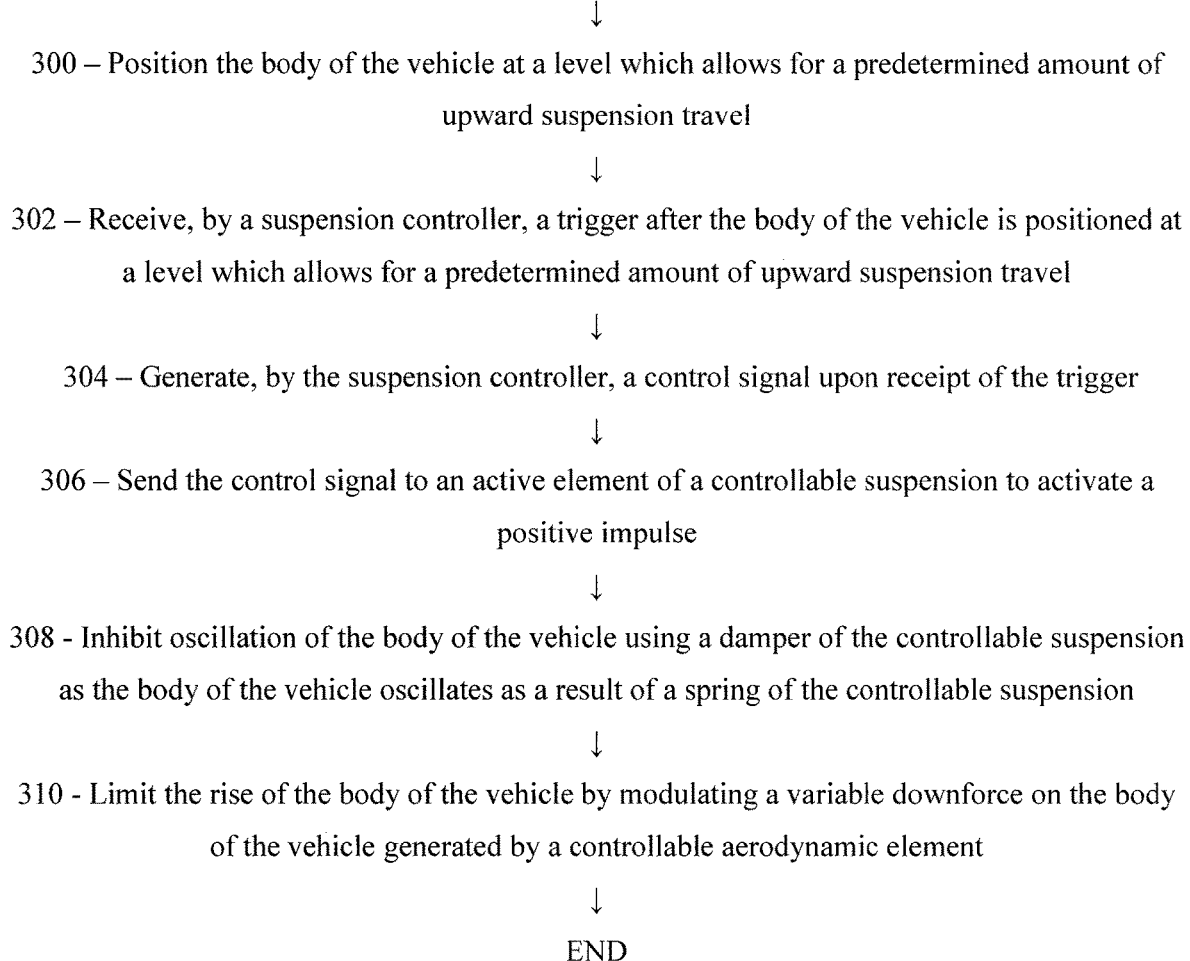
FIG. 3 is a flowchart of another preferred embodiment of the present invention.

In a second preferred embodiment of the present invention, tire traction is dynamically increased in a vehicle using a controllable suspension of the vehicle. The controllable suspension has a damper, a spring, and an active element. The active element is configured to generate a positive impulse between a body of the vehicle and a wheel of the vehicle to apply force to the wheel of the vehicle in a downward direction, also interchangeably referred to herein as a "downward impulse." The vehicle also includes a suspension controller. FIG. 3 is a flowchart of one preferred embodiment of the present invention and operates as follows:

1. Position the body of the vehicle at a level which allows for a predetermined amount of upward suspension travel. (Step 300)
2. Receive, by the suspension controller, a trigger after the body of the vehicle is positioned at a level which allows for a predetermined amount of upward suspension travel. (Step 302)
3. Generate, by the suspension controller, a control signal upon receipt of the trigger. (Step 304)
4. Send the control signal to the active element of the controllable suspension to generate the positive impulse. The positive impulse causes application of force to the wheel of the vehicle in a downward direction, thereby dynamically increasing tire traction. (Step 306).
5. Inhibit oscillation of the body of the vehicle using the damper as the body of the vehicle oscillates as a result of the spring, thereby inhibiting oscillation of tire traction. (Step 308)
6. Limit the rise of the body of the vehicle by modulating a variable downward force on the body of the vehicle generated by a controllable aerodynamic element. (Step 310). The generating of the positive impulse causes the body of the vehicle to rise. To counter this effect, the vehicle further includes the controllable aerodynamic element configured to generate the variable downforce on the body of the vehicle. Examples of the controllable aerodynamic element include spoilers, wings, fans, jets, or an adjustable body shape or angle of attack. The controllable aerodynamic element may be used prior to, concurrently with, and/or subsequently to the generating of the positive impulse. The controllable aerodynamic element preferably produces a negative impulse downward that matches the sum effect of the positive impulse upwards.

U.S. Pat. No. 11,046,143 described above does not disclose using any controllable aerodynamic element or any other mechanism to counter the rise of the vehicle due to the effect of the thumping. Similarly, U.S. Pat. No. 9,702,349 does not disclose any controllable aerodynamic element or any other mechanism to counter the rise of the vehicle due to the effect of pushing the wheel towards the ground to temporarily increase contact force.

Figure 4A:
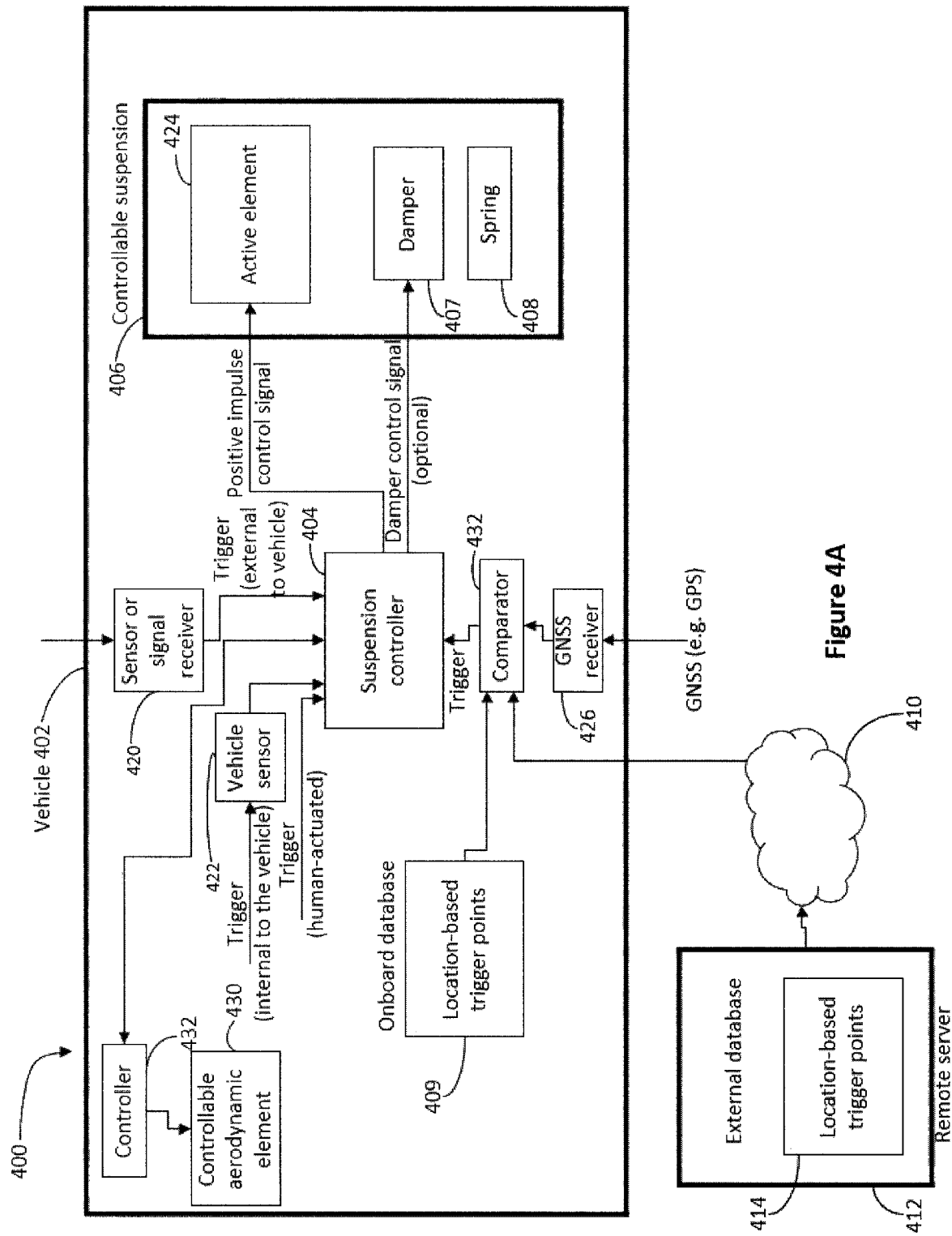
FIGS. 4A-4E are schematic diagram of the preferred embodiment of FIG. 3.

FIG. 4A is a schematic diagram of an apparatus (system) 400 for implementing one preferred embodiment of the present invention. Similar to the FIG. 2A embodiment, the apparatus (system) 400 operates within vehicle 402 but the vehicle 402 is not actually an element of the apparatus 400. The apparatus 400 includes suspension controller 404 which outputs a positive impulse control signal and a second control signal that controls operation of controllable suspension 406. The suspension controller 404 includes active element 424, damper 407, and spring 408. The suspension controller 404 receives a trigger and outputs a signal, labeled in FIG. 4A as "positive impulse control signal," to the active element 424 to generate the positive impulse.

The damper 407 and spring 408 provide the same functionality as the damper 207 and spring 208 of the first embodiment. The damper 407 may receive an optional damper control signal that is similar to the third control signal described above with respect to the first embodiment.

As discussed above, the trigger is received by the active element 424. As also discussed above, the vehicle 402 may further include controllable aerodynamic element 430. The controllable aerodynamic element 430 is connected to controller 432 which controls its operation. The controllable aerodynamic element 430 is configured to generate a variable downforce on the body of the vehicle 402. In this manner, the rise of the body of the vehicle 402 is limited by modulating the variable downforce on the body of the vehicle 402 generated by the controllable aerodynamic element 430. The actions of the controller 432 are preferably coordinated with the positive impulse control signals from the suspension controller 404, and thus there is communication between these controller elements.

In one alternative version of the second embodiment, any repositioning of the body of the vehicle caused by the positive impulse does not exceed the upward suspension travel. In this manner, the upward rise of the body of the vehicle is limited to being within the suspension travel.

In another alternative version of the second embodiment, the generating and inhibiting steps 306 and 308 are repeated at least a predetermined number of times, thereby providing repeated increases in tire traction.

B. Controllable Suspension

As discussed above, the controllable suspension 406 has an active element 424 which is configured to generate a positive impulse between a body of the vehicle 402 and a wheel of the vehicle 402 to apply force to the wheel of the vehicle 402 in a downward direction. The positive impulse causes application of force to the wheel of the vehicle 402 in a downward direction, thereby dynamically increasing tire traction. The damper 407 inhibits oscillation of the body of the vehicle 402 as the body of the vehicle oscillates as a result of the spring 408, thereby inhibiting oscillation of tire traction. The controllable suspension 406 thus differs in operation from the controllable suspension 206 in its manner of operation. For example, the active element 424 is not configured to generate positive forces between a wheel and a body of the vehicle to raise the center of mass of the body of the vehicle above a base level prior to receiving a trigger. This step only occurs in the first embodiment.

C. Trigger Details

The triggers in the embodiment of FIG. 4A operate in a similar manner as the triggers in the embodiment of FIGS. 2A-2E. However, since the second embodiment does not include anything equivalent to the first control signal of the first embodiment, FIGS. 4B-4E are provided to show further details of the trigger embodiments associated with the second embodiment. Since the individual elements of FIGS. 4B-4E which were not already identified in FIG. 4A operate in a similar manner as corresponding elements of FIGS. 2B-2E, these elements are simply identified below but are not described in further detail.

Figure 4B:
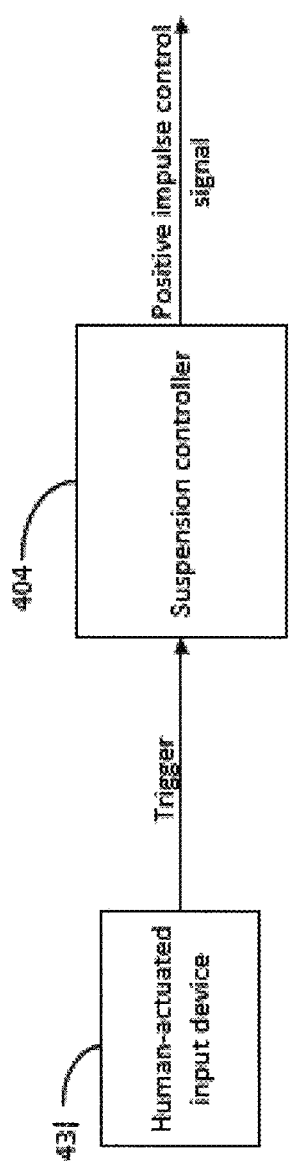

FIG. 4B: human-actuated input device 431

Figure 4C:
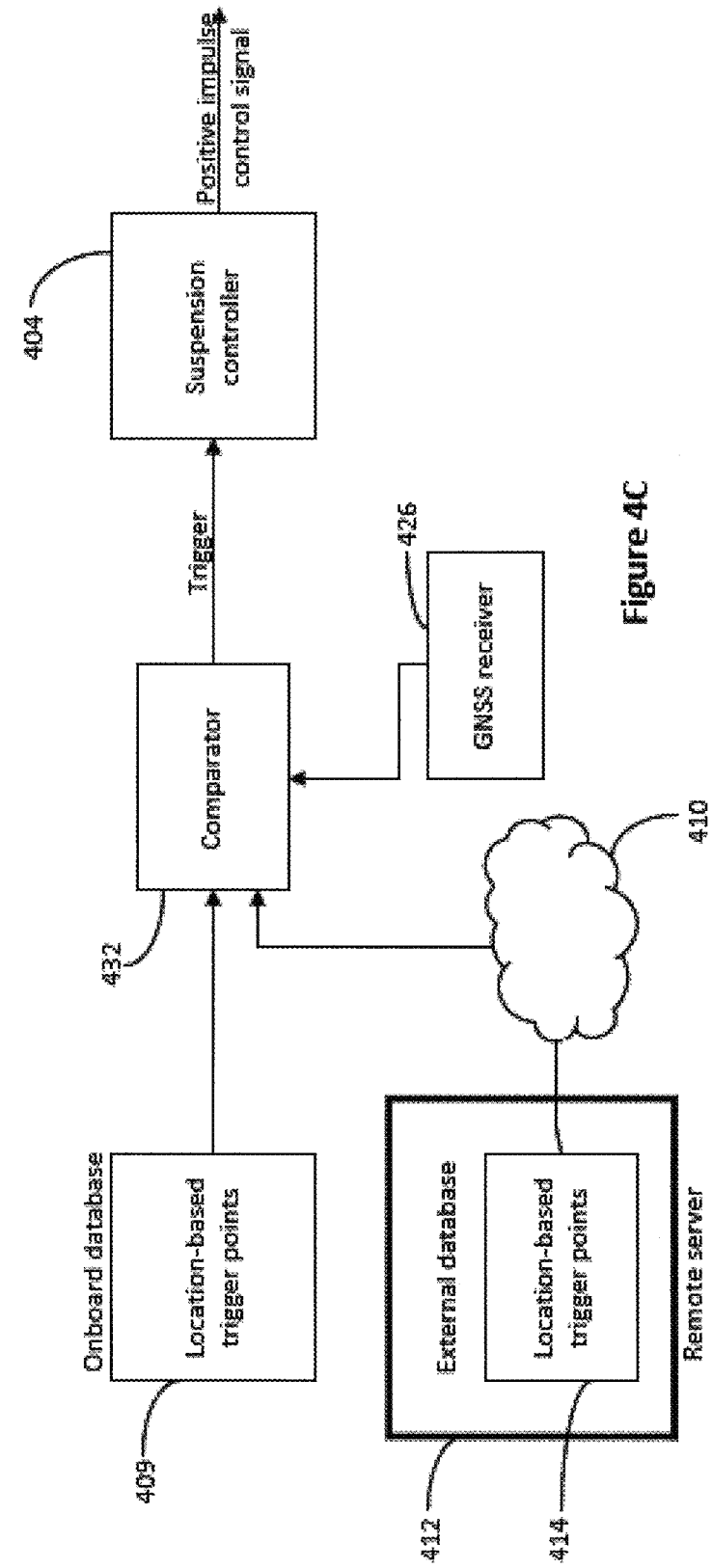

FIG. 4C: no new elements

Figure 4D:
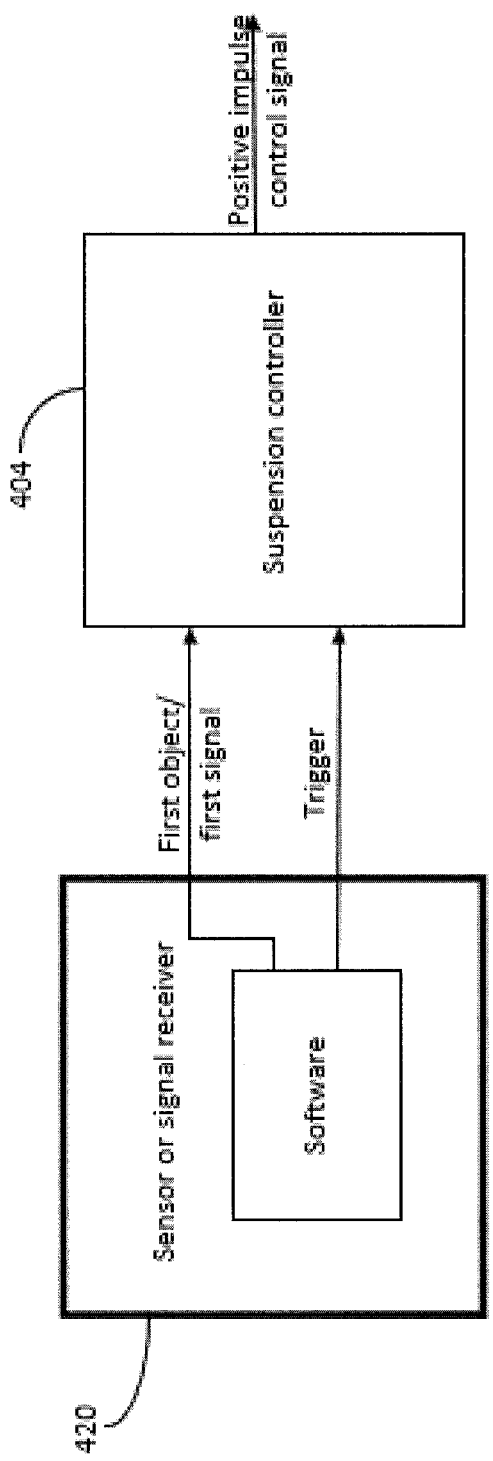

FIG. 4D: sensor or signal receiver 420

Figure 4E:
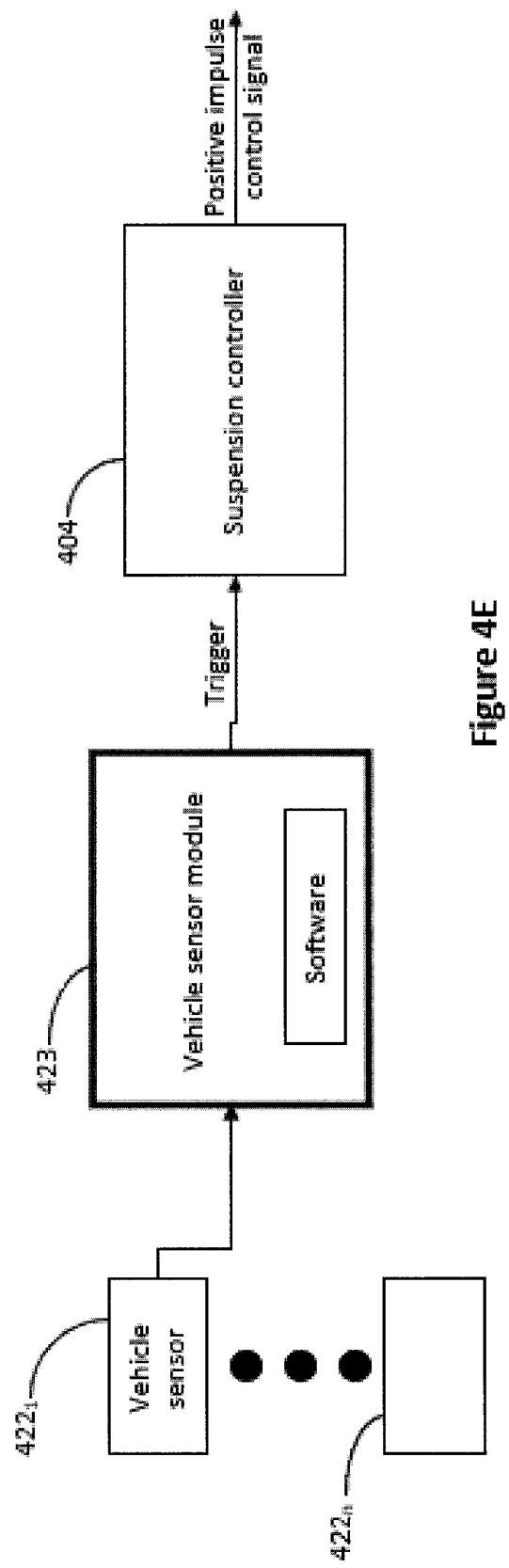
Figure 5:
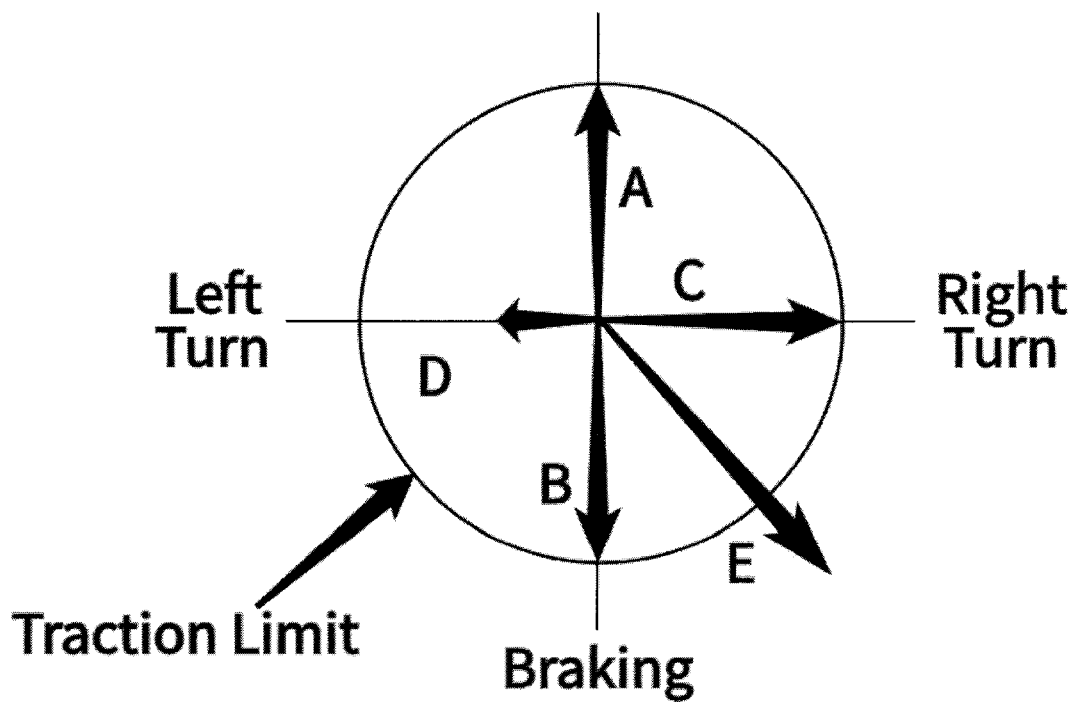
FIG. 5 is a prior art diagram of a traction circle.

FIG. 4E: vehicle sensors $422_1$-$422_n$, vehicle sensor module 423

Referring to FIG. 4E, generation of the positive impulses may be coordinated with additional vehicle conditions that were not described above with respect to the first embodiment. In one example, generation of the positive impulses may be coordinated with an anti-lock braking system (ABS) of the vehicle. As is well-known in the art, an ABS system automatically pumps the brakes when a wheel is about to lock up, thereby allowing the wheel to continue rotating, which helps the driver maintain control of the vehicle. ABS systems work by using a series of sensors to monitor the speed of each wheel. If a sensor detects that a wheel is about to lock up, it sends a signal to the ABS control unit. The control unit then reduces the brake pressure to that wheel, which allows it to continue rotating. This process happens very quickly, typically up to 20 times per second. In one preferred embodiment, generation of the positive impulses occurs continuously whenever it is detected that the ABS system is actively pumping the brakes. In a more refined embodiment, the generation of positive impulses occurs in coordination with the timing of when brake pressure is modified by the ABS.

Referring again to FIG. 4E, generation of the positive impulses may be coordinated with engine cylinder firing under load to better avoid wheel slip and maintain vehicle control. For example, when a vehicle is first starting to accelerate, jerkiness of the engine cylinder firing may cause wheel slip or loss of control of the vehicle. A signal from an engine control unit (ECU) which triggers cylinder firing may be used for coordinating the generation of the positive impulses.

D. Damper/Spring Vs. Conventional Suspension

As discussed above, the controllable suspension 406 further has a damper 407 and a spring 408, and the damper inhibiting oscillation of the body of the vehicle as the body of the vehicle oscillates as a result of the spring, thereby inhibiting oscillation of tire traction. In one embodiment of the present invention, the damper 407 and spring 408 may be components of a conventional strut and coil spring assembly, or shock absorber and coil spring, with no active element, wherein the strut or shock absorber provides a dampening effect when the vehicle goes over a bump or experiences vertically applied forces such as from hard braking. As also discussed above, active suspension systems exist today which provide control signals to modify their operation. In one alternative version of the second embodiment of the present invention, the damper 407 receives such a control signal (i.e., the damper control signal). However, unlike a conventional active suspension wherein the control signal to the damper element is based on specifically pre-programmed real time vehicle performance parameters, in this alternative version of the second embodiment of the present invention, the damper control signal is based, at least in part, on the timing of the positive impulse control signal. For example, the default dampening effect caused by the damper 407 may be stiffened milliseconds after the positive impulse control signal is applied and then gradually loosened back to a default value. In the most advanced application, the dampening effect may be dynamically modified over the entire duration of the application of the damper 407.

To the knowledge of the inventors of the present application, control signals in active suspension systems are not associated with a process that inhibits oscillation of the body of the vehicle using the strut (damper) as the body of the vehicle rises as a result of the coil spring (spring) after generation of a positive impulse causes application of force to the wheel of a vehicle in a downward direction, thereby dynamically increasing tire traction, as described above.

E. Controllable Suspension and Damper/Spring

The discussion above describes two distinct active suspension-related components of the controllable suspension 406, each performing different functions, namely, (i) the active element 424 that generates a positive impulse between a body of the vehicle and a wheel of the vehicle, and (ii) the combination of the damper 407 and the spring 408 that inhibits oscillation of the body of the vehicle after generation of the positive impulse. These suspension-related components may be constructed of two completely independent structural and electronic components such as variations of prior art suspension-related components discussed above.

F. Suspension Controller

As discussed above the suspension controller 404 outputs a positive impulse control signal and a second control signal that controls operation of controllable suspension 406. The suspension controller 404 also receives a trigger and outputs a signal, labeled in FIG. 4A as "positive impulse control signal," to the active element 424 to generate the positive impulse. In addition to these functions, the suspension controller 404 is used for additional steps of the second preferred embodiment, as follows:

Step 300 of FIG. 3: Position the body of the vehicle at a level which allows for a predetermined amount of upward suspension travel. For this step, the suspension controller 404 checks that the body of the vehicle has been positioned accordingly before allowing the process to continue forward but it may not be actively involved in the positioning process. In one version of this embodiment, the suspension controller 404 is actively involved in the positioning process and may generate and send active control signals to cause suspension components to position the body of the vehicle accordingly. In this active positioning process, the suspension controller 404 also checks that the body of the vehicle has been positioned accordingly before allowing the process to continue forward.

Step 308 of FIG. 3: Inhibit oscillation of the body of the vehicle using a damper of the controllable suspension as the body of the vehicle oscillates as a result of a spring of the controllable suspension. For this step, the suspension controller 404 may generate and send active control signals to the damper 407. However, as also discussed above, the suspension controller 404 need not necessarily control the damper 407 which may be a conventional passive element. In this passive mode, the damper control signal shown in FIG. 4A is not used.

Step 310 of FIG. 3: Limit the rise of the body of the vehicle by modulating a variable downward force on the body of the vehicle generated by controllable aerodynamic element 430. As discussed above, the actions of the controller 432 are preferably coordinated with the positive impulse control signals from the suspension controller 404, and thus there is communication between these controller elements. Thus, for this step, the suspension controller 404 may generate and send active control signals to the controller 432 for use in controlling the controllable aerodynamic element 430.

G. Combined Embodiments

Various combinations of the above-disclosed embodiments may provide even further enhanced traction over the individual embodiments. In particular, combining the first and second embodiments allows for the body drop of the vehicle in Step 104 of FIG. 1 to its maximum lower position ($x_{max}$ in FIG. 6), to be the Step 300 of FIG. 3 positioning of the body to a level which allows for a predetermined amount of upward suspension travel (i.e., the lowering of the body, Step 1 of FIG. 9).

III. Additional Considerations

Tire Traction

The first preferred embodiment disclosed herein provides increased tire traction in a vehicle. The following equations, tables, and figures are provided to mathematically demonstrate that the actions described above provide such an effect.

Traction Derivation

Figure 9:
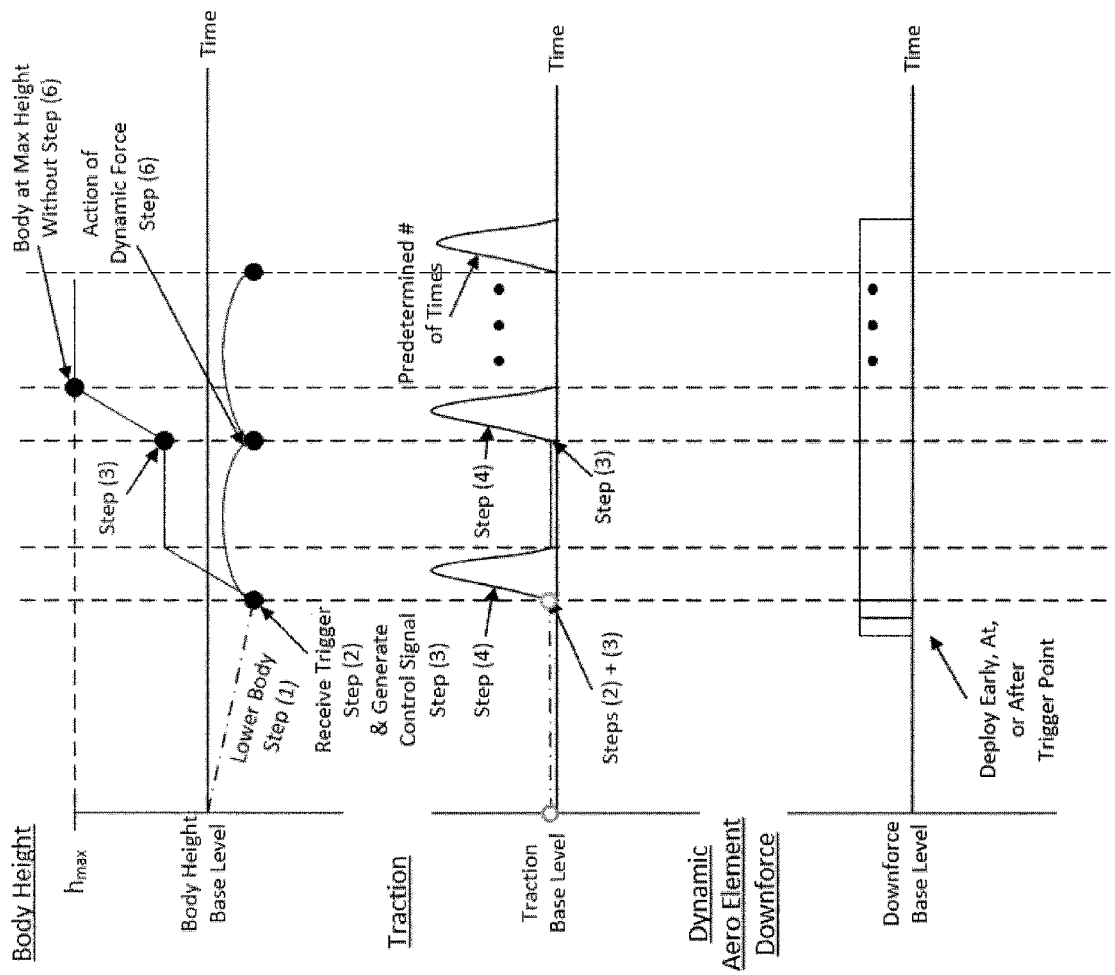
FIG. 9 is a timing diagram in body height and traction in accordance with the preferred embodiment of the present invention shown in FIGS. 3 and 4A-4E.

In order to provide a first approximation scale on the benefits of the preferred embodiments, the traction increase generated is calculated as described below. First, Newton's second law gives the weight of vehicle, $F_g$, from gravity of an object given its mass:

$$F_g = m_v g \quad \text{(Equation 1)}$$

where $m_v$ is the mass of the vehicle body, and g is the gravitational constant. The potential energy, $PE_g$, resulting from raising the center of gravity of the body of the vehicle is given by this formula:

$$PE_g = m_v g\, h \quad \text{(Equation 2)}$$

where h is the amount that the body of the vehicle is raised above a base level. Assume that the spring is attached to the body of the vehicle and that the wheels of the vehicle are on the ground as illustrated in FIG. 9.

FIG. 8 shows the compression process of the suspension springs attached to the body of the vehicle. The circled "i" represents the mass or body of the vehicle, "h" represents the height the body will be raised to prior to dropping, $x_o$ represents the base level of the body, $x_{max}$ represents the maximum compression distance of the suspension spring when the body is dropped.

Hooke's Law gives the amount of force, $F_c$, required to displace a spring by some distance, x:

$$F_c = kx \quad \text{(Equation 3)}$$

where k is the spring constant. Spring potential energy, $PE_{spring}$, resulting from the additional compression of the vehicle suspension is given by the formula:

$$PE_{Spring} = \frac{1}{2}kx^2 \quad \text{(Equation 4)}$$

Given $h_{max}$ is the maximum height that the body of the vehicle is raised above a base level, and $x_{max}$ is the maximum compression of the springs after the body of the vehicle is dropped, to a first approximation:

$$x_{max} = h_{max} \quad \text{(Equation 5)}$$

Substituting Equation 5 into Equation 3 shows that the maximum additional force of the body of the vehicle on the tires resulting from dropping the vehicle is:

$$F_{max} = 4k_{wheel} h_{max} \quad \text{(Equation 6)}$$

where $k_{wheel}$ is the spring constant for the wheel, and assuming that the vehicle has four tires.

Determining the Spring Constant:

Rearranging Equation 6 for the spring constant for a wheel, $k_{wheel}$, yields the following equation:

$$k_{wheel} = \frac{F_c}{4x} \quad \text{(Equation 7)}$$

So, one way to determine the spring constant in a vehicle is to add some amount of weight, $F_c$, to the vehicle and measure the amount, x, that the body of the vehicle is compressed downward.

Max Downforce Per Tire

The total downforce per tire (on a four wheeled vehicle) can be approximated by adding the weight of the vehicle plus the additional force from the compression on the suspension springs:

$$F_{Total\ per\ tire,max} = \frac{F_g + F_{max}}{4} = \frac{m_v g + 4k_{wheel} h_{max}}{4} \quad \text{(Equation 8)}$$

Area of Tire Contact Patch

The contact patch area, A, of the vehicle's tire with the body of the vehicle dropped can be approximated by dividing the total downforce on the tire by the pressure, P, of the air within the tire:

$$A_{per\ tire} = \frac{F_{Total\ per\ tire}}{P} \quad \text{(Equation 9)}$$

where $A_{per\ tire}$ is the area of the contact patch.

Percent Change in Contact Patch:

Percent change in contact patch =

$$\frac{A_{per\ tire,max} - A_{per\ tire,base\ level}}{A_{per\ tire,base\ level}} \times 100 \quad \text{(Equation 10)}$$

An increase in the size of the tire contact patch will allow the smaller tires to act as if they are wider. Thus, second order forces will act in a way that increases the traction of the vehicle, especially if stickier tire compounds are used.

Traction Improvements from Friction

In order to approximate the amount of traction improvement that the vehicle will experience with the body being dropped, the coefficient of static friction, CSF, can be multiplied against the total down force:

$$F_{Traction,Total} = CSF \, F_{Total} \quad \text{(Equation 11)}$$

where $F_{Traction, Total}$ is the amount of traction from the weight of the wheels on the running surface. Thus, the percent change in traction to first approximation may be seen from the following formula:

$$\text{Percent change in traction} = \frac{F_{Traction,Total,max} - F_{Traction,Total,base\ level}}{F_{Traction,Total,base\ level}} \times 100 \quad \text{(Equation 12)}$$

Compression Time Approximation

Using the equation for simple harmonic motion, the relationship between position and time can be found:

$$x(t) = A \cos(\omega t) \quad \text{(Equation 13)}$$

where x(t) is the position of the spring, A is the amplitude of the suspension spring's period, $\omega$ is the angular velocity, and t is the elapsed time. The amplitude is the distance from rest to maximum compression or maximum extension of the spring, thus:

$$x_{max} = A \quad \text{(Equation 14)}$$

Also, $\omega$ can be rewritten as:

$$\omega = 2\sqrt{\frac{k_{wheel}}{m_v}} \quad \text{(Equation 15)}$$

where $k_{wheel}$ is the spring constant (for one wheel) and $m_v$ is the mass of the vehicle. Substituting the equation for x and the rewritten version of $\omega$ derived above into the equation for simple harmonic motion yields:

$$x(t) = h_{max} \cos\left(2\sqrt{\frac{k_{wheel}}{m_v}}\, t\right) \quad \text{(Equation 16)}$$

The period of the suspension spring, T, can be found through the equation:

$$T = \pi \sqrt{\frac{m_v}{k_{wheel}}} \quad \text{(Equation 17)}$$

The duration at which the wheel has enhanced traction is approximately half of T as seen in FIG. 6.

Example of Traction Improvements

Using the derived equations, an example is provided of a preferred embodiment of the invention in operation. Table 1A and 1B contain some sample parameters for a vehicle body. The metric values are the first row and imperial values are the second row. The last two columns of Table 1B show spring constants for a vehicle with very stiff springs, stiff springs, and soft springs.

TABLE 1A

Example parameters

| Mass of vehicle body $m_v$ | Maximum height vehicle body is raised $h_{max}$ | Weight $F_g$ | $F_g$ per wheel | Maximum spring compression $x_{max}$ | Tire pressure P |
|---|---|---|---|---|---|
| 2000 kg | 0.05 meters | 19620N | 4905N | 0.05 meters | 206843 Pascals |
| 137.04 slug | 1.97 in | 4411 lbs | 1103 lbs | 1.97 in | 30 PSI |

TABLE 1B

Example parameters (continued)

| Tire Width | Tire Diameter | Coefficient of static friction CSF | Spring constant k$wheel$ (Very Stiff) | Spring constant k$wheel$ (Stiff) | Spring constant k$wheel$ (Soft) |
|---|---|---|---|---|---|
| 0.25 m | 0.75 m | 0.7 | $200,000 \frac{N}{m}$ | $49,000 \frac{N}{m}$ | $9,810 \frac{N}{m}$ |
| 9.84 in | 29.53 in | 0.7 | $1,142 \frac{lbs}{in}$ | $280 \frac{lbs}{in}$ | $56 \frac{lbs}{in}$ |

Using the equations derived above, Table 2 provides the example results. The table assumes that the 4-wheeled body of the vehicle is dropped at the speed of gravity. Using Equations 13 to 17, the last column provides the period of oscillation of the spring for the preferred embodiment found in Table 1 assuming that no dampening is being provided.

TABLE 2

Example results

| Type of spring | Maximum downforce per tire (Equation 8) | Approx. Change in Area of contact patch | Traction at base level | Maximum Traction | Max Traction improvement from increased tire load | Period T (FIG. 6 traction improvement equals ½ T) |
|---|---|---|---|---|---|---|
| Very Stiff | 14,905N | 0.056 m² 204% | 3430N | 10,400N | 7000N 204% | 0.31 seconds |
|  | 3,350 lbs | 75 in² 204% | 771 lbs | 2,350 lbs | 810 lbs 204% | (150 ms) |
| Stiff | 7358N | 0.012 m² 50% | 3430N | 5147N | 1717N 50% | 0.63 seconds |
|  | 1654 lbs | 18.4 in² 50% | 771 lbs | 1157 lbs | 386 lbs 50% | (315 ms) |
| Soft | 5396N | 0.0024 m² 10% | 3430N | 3773N | 343N 10% | 1.4 seconds |
|  | 1213 lbs | 3.7 in² 10% | 771 lbs | 848.2 lbs | 77 lbs 10% | (700 ms) |

Regarding the second preferred embodiment, the one or more positive impulses that are generated will each produce an average tire traction improvement that is on the order of the traction improvement that is provided by the first preferred embodiment given that the allowed amount of rise of the body of the vehicle is the same between the two embodiments, absent the action of the aerodynamic elements in the second embodiment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of dynamically increasing tire traction in a vehicle, the vehicle including (i) a controllable suspension having (A) a damper, (B) a spring, and (C) an active element, the active element being configured to generate a positive impulse between a body of the vehicle and a wheel of the vehicle to apply force to the wheel of the vehicle in a downward direction, (ii) a suspension controller, and (iii) a controllable aerodynamic element configured to generate a variable downforce on the body of the vehicle, the method comprising:

(a) positioning the body of the vehicle at a level which allows for a predetermined amount of upward suspension travel;
(b) receiving, by the suspension controller, a trigger after the body of the vehicle is positioned at a level which allows for a predetermined amount of upward suspension travel;
(c) the suspension controller generating a first control signal upon receipt of the trigger;
(d) the suspension controller sending the first control signal to the active element to generate the positive impulse, the positive impulse causing application of force to the wheel of the vehicle in a downward direction, thereby dynamically increasing tire traction;
(e) inhibiting oscillation of the body of the vehicle using the damper as the body of the vehicle oscillates as a result of the spring, thereby inhibiting oscillation of tire traction; and
(f) limiting the rise of the body of the vehicle resulting from the positive impulse between the body of the vehicle and the wheel of the vehicle by modulating the variable downforce on the body of the vehicle generated by the controllable aerodynamic element.

2. The method of claim 1 wherein any repositioning of the body of the vehicle caused by the positive impulse does not exceed the upward suspension travel.

3. The method of claim 1 wherein steps (d), (e), and (f) are repeated at least a predetermined number of times after receipt of the trigger, the suspension controller thereby generating additional first control signals and the active element thereby generating additional positive impulses to allow for steps (d), (e), and (f) to be repeated.

4. The method of claim 1 wherein the positive impulse is applied to the body of the vehicle over a drive wheel of the vehicle.

5. The method of claim 1 wherein the wheels of the vehicle experience different amounts of load during certain types of vehicle motion, and wherein the positive impulse is located over the wheels of the vehicle which are expected to experience the greatest amount of load.

6. The method of claim 1 wherein the active element includes an electromagnet.

7. The method of claim 1 wherein the trigger is a human-actuated signal.

8. The method of claim 1 wherein the vehicle stores location-based trigger points in a database, and wherein step (a) is performed when the vehicle is within a first predefined proximity of one of the location-based trigger points, and the trigger is an automatic signal that is actuated when the vehicle is within a second predefined proximity of one of the location-based trigger points.

9. The method of claim 1 wherein the vehicle includes a sensor configured to detect a predefined object, wherein the trigger is an automatic signal that is generated after the vehicle detects the object.

10. The method of claim 1 wherein the trigger is an automatic signal that is generated upon detection of brake pedal force of the vehicle being greater than a predetermined amount of brake pedal force.

11. The method of claim 1 wherein the vehicle includes an accelerometer, and the trigger is an automatic signal that is generated upon detection of an accelerometer threshold being exceeded.

12. The method of claim 1 wherein the vehicle includes a wheel slip detector, and the trigger is an automatic signal that is generated upon detection of wheel slip.

13. The method of claim 1 further comprising:
   (g) the suspension controller checking that the body of the vehicle has been positioned at a level which allows for a predetermined amount of upward suspension travel, wherein the remaining steps (b)-(f) are not performed until the body of the vehicle has been positioned at a level which allows for a predetermined amount of upward suspension travel.

14. The method of claim 1 wherein step (a) is performed by the suspension controller generating and sending active control signals to cause suspension components to position the body of the vehicle at a level which allows for a predetermined amount of upward suspension travel.

15. The method of claim 1 wherein the suspension controller generates and sends one or more damper control signals to the damper to assist in performing step (e).

16. An apparatus for dynamically increasing tire traction in a vehicle, the vehicle including (i) a controllable suspension having an active element, the active element being configured to generate a positive impulse between a body of the vehicle and a wheel of the vehicle to apply force to the wheel of the vehicle in a downward direction, and (ii) a controllable aerodynamic element configured to generate a variable downforce on the body of the vehicle, the apparatus comprising a suspension controller configured to:
   (a) receive a trigger;
   (b) generate a first control signal upon receipt of the trigger;
   (c) send the first control signal to the active element to generate the positive impulse, the positive impulse causing application of force to the wheel of the vehicle in a downward direction, thereby dynamically increasing tire traction; and
   (d) generate and send active control signals to the controllable aerodynamic element to cause the controllable aerodynamic element to limit the rise of the body of the vehicle resulting from the positive impulse between the body of the vehicle and the wheel of the vehicle by modulating the variable downforce on the body of the vehicle generated by the controllable aerodynamic element.

17. The apparatus of claim 16 wherein the body of the vehicle is positioned at a level which allows for a predetermined amount of upward suspension travel before the suspension controller performs its functions, wherein the suspension controller is further configured to:
   (e) generate and send active control signals to cause suspension components to position the body of the vehicle at a level which allows for a predetermined amount of upward suspension travel.

18. The apparatus of claim 17 wherein the vehicle stores location-based trigger points in a database, and wherein the suspension controller generates and sends active control signals to cause suspension components to position the body of the vehicle at a level which allows for a predetermined amount of upward suspension travel when the vehicle is within a first predefined proximity of one of the location-based trigger points, and the trigger is an automatic signal that is actuated when the vehicle is within a second predefined proximity of one of the location-based trigger points.

19. The apparatus of claim 16 wherein the suspension controller is further configured to:
   (e) repeat at least a predetermined number of times after receipt of the trigger (i) the sending of the first control signal to the active element to generate the positive impulse, and (ii) the generating and sending of active control signals to the controllable aerodynamic element,
   the suspension controller thereby generating additional first control signals and the active element thereby generating additional positive impulses, and the suspension controller thereby generating and sending additional active control signals to the controllable aerodynamic element.

20. The apparatus of claim 16 wherein the controllable suspension further includes a damper and a spring, and oscillation of the body of the vehicle is inhibited using the damper as the body of the vehicle oscillates as a result of the spring, thereby inhibiting oscillation of tire traction, and wherein the suspension controller is further configured to:
   (e) generate and send one or more damper control signals to the damper to assist in inhibiting oscillation of the vehicle as the body of the vehicle oscillates as a result of the spring.

21. The apparatus of claim 16 wherein the suspension controller is further configured to:
   (e) check that the body of the vehicle has been positioned at a level which allows for a predetermined amount of upward suspension travel, wherein the suspension controller is further configured to not perform its remaining functions until the body of the vehicle has been positioned at a level which allows for a predetermined amount of upward suspension travel.

22. The apparatus of claim 16 wherein the positive impulse is applied to the body of the vehicle over a drive wheel of the vehicle.

23. The apparatus of claim 16 wherein the wherein the wheels of the vehicle experience different amounts of load during certain types of vehicle motion, and wherein the positive impulse is located over the wheels of the vehicle which are expected to experience the greatest amount of load.

24. The apparatus of claim 16 wherein the active element includes an electromagnet.

25. The apparatus of claim 16 wherein the trigger is a human-actuated signal.

26. The apparatus of claim 16 wherein the vehicle includes a sensor configured to detect a predefined object, wherein the trigger is an automatic signal that is generated after the vehicle detects the object.

27. The apparatus of claim 16 wherein the trigger is an automatic signal that is generated upon detection of brake pedal force of the vehicle being greater than a predetermined amount of brake pedal force.

28. The apparatus of claim 16 wherein the vehicle includes an accelerometer, and the trigger is an automatic signal that is generated upon detection of an accelerometer threshold being exceeded.

29. The apparatus of claim 16 wherein the vehicle includes a wheel slip detector, and the trigger is an automatic signal that is generated upon detection of wheel slip.

\* \* \* \* \*